(12) United States Patent
Jaber et al.

(10) Patent No.: US 10,650,041 B2
(45) Date of Patent: *May 12, 2020

(54) IMAGE RECOGNITION VERIFICATION

(71) Applicant: Nant Holdings IP, LLC, Culver City, CA (US)

(72) Inventors: Mustafa Jaber, Los Angeles, CA (US); Bing Song, La Canada, CA (US); Jeremi Sudol, New York, NY (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,490

(22) Filed: May 20, 2019

(65) Prior Publication Data

US 2019/0272284 A1 Sep. 5, 2019

Related U.S. Application Data

(60) Division of application No. 14/736,222, filed on Jun. 10, 2015, now Pat. No. 10,318,576, which is a continuation-in-part of application No. 14/275,067, filed on May 12, 2014, now Pat. No. 9,864,758.

(60) Provisional application No. 61/915,098, filed on Dec. 12, 2013.

(51) Int. Cl.
*G06F 16/583* (2019.01)
(52) U.S. Cl.
CPC ........ *G06F 16/5854* (2019.01); *G06F 16/583* (2019.01); *G06T 2207/10024* (2013.01)

(58) Field of Classification Search
None
See application file for complete search history.

(56) References Cited

U.S. PATENT DOCUMENTS

| | | | |
|---|---|---|---|
| 7,236,632 B2 * | 6/2007 | Erol | G06K 9/00442 382/218 |
| 8,073,189 B2 | 12/2011 | Gering | |
| 8,155,451 B2 | 4/2012 | Kamata et al. | |
| 8,611,675 B2 | 12/2013 | Chow et al. | |
| 8,625,902 B2 * | 1/2014 | Baheti | G06K 9/6857 382/190 |
| 8,805,117 B2 * | 8/2014 | Liu | G06K 9/4671 382/190 |

(Continued)

OTHER PUBLICATIONS

Zhou, Wengang, et al. "Binary sift: Towards efficient feature matching verification for image search." Proceedings of the 4th International Conference on Internet Multimedia Computing and Service. ACM, 2012. (Year: 2012).*

(Continued)

*Primary Examiner* — Andrae S Allison
(74) *Attorney, Agent, or Firm* — Mauriel Kapouytian Woods LLP; Andrew A. Noble

(57) ABSTRACT

Systems and methods of verifying the results of an initial image recognition process are presented. A verification engine can receive a set of candidate images corresponding to the results of an image recognition process performed on a captured query image. The verification engine can determine an appropriate verification technique to apply to the images of the candidate set, and classify, re-rank or otherwise re-organize the candidate set such that the best match from the candidate set is confirmed as a proper match.

19 Claims, 10 Drawing Sheets

(56) References Cited

U.S. PATENT DOCUMENTS

| | | | |
|---|---|---|---|
| 9,355,123 B2 | 5/2016 | Wnuk et al. | |
| 9,864,758 B2* | 1/2018 | Jaber | G06F 16/5854 |
| 10,318,576 B2* | 6/2019 | Jaber | G06F 16/583 |
| 2002/0169761 A1* | 11/2002 | Endo | G06F 16/9038 |
| 2006/0066504 A1* | 3/2006 | Sampsell | G09G 3/3466 |
| | | | 345/1.1 |
| 2009/0052774 A1* | 2/2009 | Yoshii | G06T 5/009 |
| | | | 382/167 |
| 2011/0212717 A1 | 9/2011 | Rhoads et al. | |
| 2011/0244919 A1 | 10/2011 | Aller et al. | |
| 2012/0207397 A1 | 8/2012 | Nagatomo et al. | |
| 2012/0328197 A1* | 12/2012 | Sanderson | G06K 9/6227 |
| | | | 382/191 |
| 2014/0341476 A1* | 11/2014 | Kulick | G06K 9/6267 |
| | | | 382/224 |
| 2015/0310306 A1* | 10/2015 | Song | G06K 9/4642 |
| | | | 382/159 |

OTHER PUBLICATIONS

Won, In-Su, Tae-Wang Kim, and Dong-Seok Jeong. "Binary vector construction method for fast image matching in MPEG-7 CDVS framework." The 19th Korea-Japan Joint Workshop on Frontiers of Computer Vision. IEEE, 2013. (Year: 2013).*

Won et al., "Binary vector construction method for fast image matching in MPEG-7 CDVS framework," The 19th Korea-Japan Joint Workshop on Frontiers of Computer Vision, IEEE, Mar. 2013, pp. 262-265.

Dorie et al., "Using Advanced 3D Texturing Hardware to Convert Planar YUV to RGB," https://multimedia.cx/yuv-3d-rgb.txt, Aug. 20, 2003.

Wang et al., "Reliable RANSAC Using a Novel Preprocessing Model," Computational and Mathematical Methods in Medicine, http://dx.doi.org/10.1155/2013/672509, vol. 2013, Article ID 672509, 5 pages.

Zhou et al., "Binary sift: Towards efficient feature matching verification for image search," Proceedings of the 4th International Conference on Internet Multimedia Computing and Service, ACM, 2012, 6 pages.

Bulo et al., "Content-based image retrieval with relevance feedback using random walks," Pattern Recognition, vol. 44, No. 9, 2011, pp. 2109-2122.

Smith et al., "Tools and Techniques for Color Image Retrieval," Storage and Retrieval for Still Image and Video Databases IV, vol. 2670, 1996, pp. 426-437.

Benavidez et al., "Mobile Robot Navigation and Target Tracking System," 6th International Conference on System of Systems Engineering, IEEE, 2011, pp. 299-304.

* cited by examiner

IMAGE RECOGNITION VERIFICATION

CROSS REFERENCE TO RELATED APPLICATIONS

This application is a divisional of U.S. application Ser. No. 14/736,222 filed Jun. 10, 2015, which is a continuation-in-part of U.S. application Ser. No. 14/275,067 filed May 12, 2014, which claims the benefit of U.S. Provisional Application No. 61/915,098, filed Dec. 12, 2013. The entire content of these applications is hereby incorporated herein by reference.

TECHNICAL FIELD

This disclosure relates generally to image-based object recognition, and more specifically to image recognition verification for image-based object recognition.

BACKGROUND

The following description includes information that may be useful in understanding the present invention. It is not an admission that any of the information provided herein is prior art or relevant to the presently claimed invention, or that any publication specifically or implicitly referenced is prior art.

Image recognition technologies have allowed users to enrich their experiences and digital interactions with the world around them. By recognizing aspects of the user's environment from a digital representation, a user's cell phone can quickly provide the user with additional information about interesting aspects of their environment, and enhance the available interactions with the environment itself.

Unfortunately, image recognition techniques in use today are not perfect. For example, factors such as poor image capture conditions, poor captured image quality or a lack of image references for captured subject can contribute to a failure to recognize a subject in an image, or to falsely identify the subject, thus generating false positives.

Others have put forth efforts towards enhancing the reliability of image recognition. For example, U.S. patent publication 2011/0212717 to Rhoads, et al ("Rhoads"), titled "Methods and Systems for Content Processing", published Sep. 1, 2011, discusses various image processing techniques that can be used for image recognition. Rhoads fails to discuss image verification techniques for a recognized image, and using secondary processing specifically targeted at image verification.

U.S. Pat. No. 7,236,632 to Erol, et al ("Erol"), titled "Automated Techniques for Comparing Contents of Images", issued Jun. 26, 2007, discusses matching an input image to a set of candidates, such as by classifying an image and selecting a matching technique based on the image classification. While Erol discusses using one or more matching techniques to meet a match satisfaction threshold, Erol lacks any discussion of image processing techniques used for image verification.

U.S. Pat. No. 8,073,189 to Gering, titled "Methods and Systems for Selecting an Image Application Based on Image Content", issued Dec. 6, 2011, discusses selecting an image processing application based on image content. The image can be classified and selecting the application based on the image class. Gering is silent as to image verification to confirm image recognition was properly done.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

Thus, there is still a need for image verification techniques that can rapidly and efficiently increase the reliability of image recognition.

SUMMARY

The inventive subject matter provides apparatus, systems and methods that can verify the result of an executed image recognition process based on a provided source image and a set of candidate result images returned by the executed image recognition process. The verification can be performed by selecting an image processing technique appropriate for the particular verification. A verification technique can include selecting an image processing technique and a matching technique, based on a plurality of factors.

The system can include a verification engine communicatively coupled to a candidate database, and having communication interfaces that allow it to exchange data with other data sources, computing devices, processing modules, etc.

The verification engine can be configured to receive a set of candidate images from the candidate database, corresponding to the results of an image recognition process executed on a query image. The candidate results can be considered to be the 'closest' matches to the query image, as determined by the executed image recognition and associated matching threshold. The verification engine can also receive the query image itself. The query image can be an image taken by a user using a digital camera, mobile phone camera, tablet camera, etc., and can contain one or more real-world objects to be identified via image recognition.

Based on one or more of the candidate images in the results set, the verification engine can select a verification technique to use in verifying the candidates. The verification technique can include an implementation of an image processing technique and a matching technique. In embodiments, the verification technique can also use characteristics associated with the query image, characteristics associated with the image recognition technique used in image recognition, and/or characteristics associated with various available verification techniques in selecting the verification technique. A different verification technique can be selected for each of the candidate images.

The verification technique can be configured to use the selected verification technique(s) to generate a match score for the query image and each candidate image within the returned set, and classify the candidates in the set based on the scores. The classifying can include a reorganization of the candidate images based on the scores.

In embodiments, the verification engine can implement image processing techniques to generate down-sampled signature versions of the query image and the candidate images to use in matching the images. Multiple down-sampled signatures of a query image can be generated, to properly match up with the signature of each candidate image.

In embodiments, the verification engine can perform verification based on regions of interest of a query image and each candidate image. A candidate image can have one or more regions of interest, which can be pre-determined during database generation or can be determined during image recognition. The verification engine can generate regions of interest in the query image based on the existing regions of interest in one or more of the candidate images, and execute matching techniques based on the regions of interest instead of the images as a whole.

In embodiments, the verification engine can implement the region-of-interest approach with image signatures. In these embodiments, the signatures generated for the candidates are those that result in a region of interest having a desired size. For the query images, multiple signatures can be generated of varying sizes. For each candidate image, the signature of the query image having a corresponding region of interest thumbnail of a desired size is selected for use in matching.

As part of image processing, the verification engine can be configured to rectify the query image (or signature of the query image) to be used, such that the query image is in canonical form for matching analysis. The rectification can include eliminating skew in the query image.

The verification engine can be configured to perform database building and training functions, including classifying images to be added to the candidate database and verification techniques according to image classes.

Various objects, features, aspects and advantages of the inventive subject matter will become more apparent from the following detailed description of preferred embodiments, along with the accompanying drawing figures in which like numerals represent like components.

DETAILED DESCRIPTION

Figure 1:
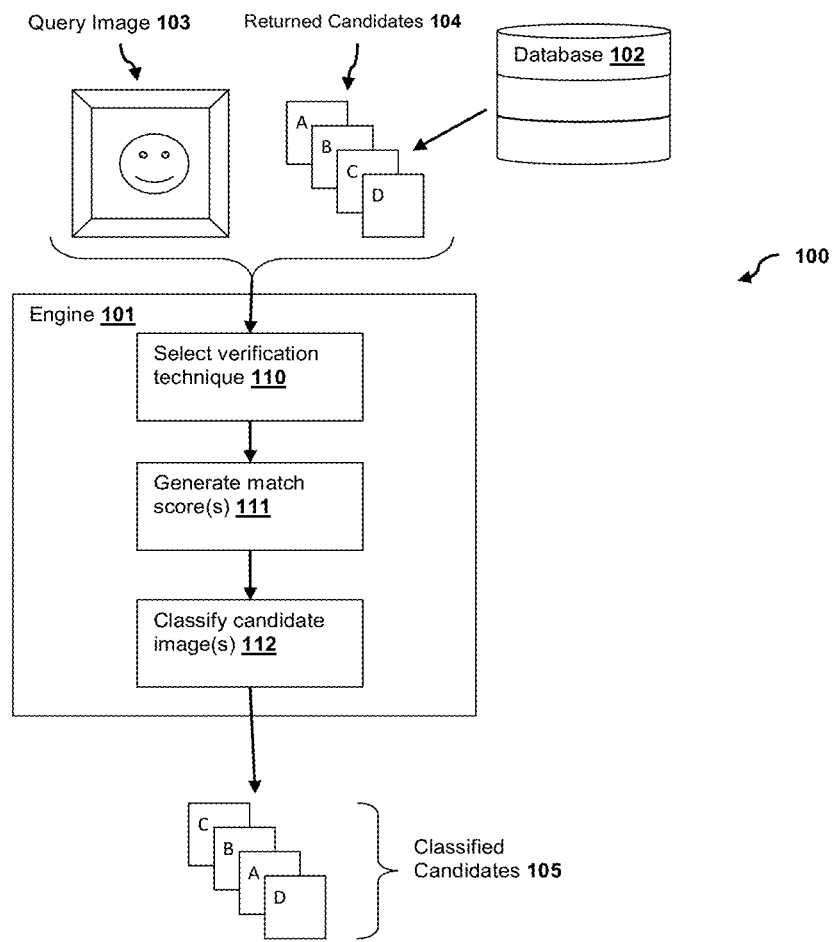
FIG. 1 provides an overview of an example execution of the verification of image recognition performed on a query image, according to systems and methods of the inventive subject matter.

Throughout the following discussion, numerous references will be made regarding servers, services, interfaces, engines, peers, clients, modules, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions. One should further appreciate the disclosed computer-based implementations of algorithms, processes, methods, or other types of instruction sets can be embodied as a computer program product comprising a non-transitory, tangible computer readable media storing the instructions that cause a processor to execute the disclosed steps. One should appreciate that the disclosed techniques increase the efficiency with which a computing device is able to retrieve object information in a database. A computing device derives one or more electronic query signals that instruct the database to retrieve object information where the query signals are generated based on key frame data derived through the use of one or more multiple analysis algorithms applied to a digital representation. One should appreciate that the disclosed techniques provide many advantageous technical effects, including enhancing the reliability of image recognition techniques at a reduced computational cost. For example, the disclosed computing devices operate on digital data (e.g., image data, video data, etc.) according to implementations of image or verification algorithms. Through configuring the computing devices according to the disclosed techniques, the computing devices are able to increase the reliability of accurately recognizing digital representations of objects that the computing devices would lack using traditional techniques or would lack a priori without such configuration.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

FIG. 1 provides an illustrative example of the verification of an executed image recognition process, according to an example implementation of various systems, methods and functions of the inventive subject matter.

As shown in FIG. 1, the system 100 can include a verification engine 101 communicatively coupled to a candidate database 102.

In embodiments, verification engine 101 can be embodied as a computer-executable instructions stored on one or more non-transitory computer readable storage media that, when executed by one or more computer processors, cause the one or more computer processors to carry out functions of the inventive subject matter associated with the verification engine 101. In these embodiments, the verification engine 101 can be stored and executed entirely within a single computing device, or distributed among a plurality of computing devices that are communicatively coupled via network interfaces over data exchange networks such as the Internet, Ethernet, LAN, WAN, cellular, USB, HDMI, wireless, wired, near-field communication, etc.). For example, the verification engine 101 can be stored entirely within a user's computing device (e.g., cellular phone, digital camera, tablet, laptop, desktop, etc.), entirely within a dedicated server or server farm (e.g., PaaS, IaaS, SaaS, cloud, etc.) remote from the user's computing device, or distributed between a user's computing device and a dedicated server.

In embodiments, the verification engine 101 can be embodied as a specially programmed processor (e.g., FPGA, PLA, ASIC, etc.), hardcoded with instructions that, when executed, cause the processor to execute the functions of the inventive subject matter associated with verification engine 101. In embodiments, the verification engine 101 can be embodied as one or more circuits configured to execute the functions of the inventive subject matter associated with verification engine 101.

The candidate database 102 can be configured or programmed to store a plurality of candidate images. The candidate database 102 can be embodied as at least one non-transitory computer-readable storage medium (e.g., hard drive, solid state drive, flash memory, optical media, dedicated server computer, etc.) configured to store candidate images. In embodiments, the candidate database 102 can also store information associated with the candidate images that facilitates indexing, sorting, storage, retrieval, etc. In embodiments, the candidate database 102 can be integral to the same computing device as the verification engine 101. In embodiments, the candidate database 102 can be remote to the verification engine 101, and communicatively coupled via communication interfaces enabling data exchanges over a network (e.g., Internet, Ethernet, cellular, USB, HDMI, LAN, WAN, wireless, wired, near-field communication, etc.).

The candidate images stored in candidate database 102 can be considered reference images used in image recognition. The candidate images can include images depicting real-world objects (e.g., physical objects, printed or other visible two-dimensional imagery, etc.) and/or parts or segments of real-world objects, which can then be used during image recognition to recognize one or more real-world objects in a query image. As such, the candidate images can be considered a collection of images depicting objects that an image recognition system and/or image verification system "knows" and can reference to identify objects depicted in a received query image. It should be appreciated the candidate images stored in candidate database 102 may include the actual, original images (e.g., JPGs, PNGs, etc.) or other representations derived from the original images; descriptors, keyframes, etc., as discussed below.

In embodiments, a candidate image can include or reference additional data that includes information about the candidate image, or associated with characteristics of the candidate image. This can include information such as identification information or characteristics associated with the object depicted in the candidate image and information associated with a characteristic of the candidate image itself. Examples of the additional information of a candidate image include one or more of an object class, a product class, a product family, a cluster of products, color information, shape information, text information, a logo, a product history, a time, a location, an orientation, a context, a position, a user, a license agreement, an image attribute, a frame rate, a hierarchy, a priority, an ontology or metadata.

In embodiments, image processing techniques can be applied to candidate images as the candidate images are added to the candidate database 102, and the processed versions of the images can be stored along with the original candidate images in the database 102. Some examples of the processed versions can include thumbnails, reduced-resolution images, grayscale images, etc.

In embodiments, the candidate database 102 can also store data objects representing each of the stored candidate images. These data objects can be generated as a function of the characteristics of each candidate image, including derivative or processed versions of the candidate image. The data objects can include object features corresponding to the characteristics of the candidate image, as well as addresses of or links to the candidate images themselves, including various versions of the images. In these embodiments, the selection of the verification technique can be based on the features of data objects, and the candidates returned in the appropriate format for the technique.

The candidate images stored in candidate database 102 can be categorized according to one or more of the characteristics of the images and/or characteristics of the content depicted in the images, such as the image and content characteristics described above. In embodiments, the candidate database 102 can assign classifications to the categorized sets of images.

As illustrated in FIG. 1, image recognition is performed on a query image 103 to return either a single candidate image 104 (e.g., for which verification can be later performed to determine if the candidate image meets an image recognition verification threshold) or a plurality of (i.e., at least two) candidate images 104 (e.g., for which verification can be later performed to rank, re-rank or eliminate candidate images based on a threshold) from the candidate database 102, corresponding to potential matches for the query image 103. The query image 103 can be an image captured by an image sensor within or in communication with a user's computing device, a digital image representation of a scene including depictions of real-world objects. For example, the query image 103 can be an image captured by a user's digital camera, mobile phone camera, tablet camera, laptop camera, kiosk, virtual fitting room, game console or system, appliance, medical imaging system, a robot, vehicle, etc., and provided to an image recognition system.

The query image 103 can include data containing information about the query image. The information can include one or more of the same types of information included in a candidate image. The query image 103 can also include information such as capture device information (e.g., device identifier, device network address, current device location), user information (e.g. user identifier, user login credentials, user social network credentials, user device preferences, etc.), capture location (e.g., location where image was captured), capture device type (e.g., cellular phone, stand alone video camera, stand-alone still image camera, etc.), capture device specifications (e.g., resolution capabilities, frame rate capabilities, firmware version, software version, networking capability, processing capability, memory capacity, available image formats, etc.), capture device sensor data (e.g. GPS, accelerometer, motion sensor, temperature sensor, humidity sensor, light sensor), capture device orientation (e.g. tilt, pointing direction, etc.), time of image capture, date of image capture, capture environment conditions (e.g., lighting, weather, etc.), image capture device settings (e.g. image file type, resolution, frame rate, etc.), image metadata, capturing device context, user context, etc. A capturing device context can be considered one or more device parameters as understood by the capturing device (e.g., location, time, information address, image capture application etc.), such that a capturing device captured the image for use in another application (e.g., social networking) and thus, can perform processing functions accordingly. A user context can include information associated with an inferred or explicitly stated "state" of a user (or another image recognition requestor when capturing the image. For example, the user context information can be in the form of a query (e.g., a submitted image of a dog with a query question of "What kind of dog is this?"), or a stated purpose (e.g. the request comes from a user via a law-enforcement interface, carrying a user context of using the image recognition for investigative work). The query image 103 can comprise still image data or video image data. Examples of still image formats include RAW, JPEG, GIF, PNG, BMP, etc. Examples of types of video image formats include MPEG, AVI, WMV, MP4, etc.

The image recognition can be performed using one of a variety of image recognition techniques. In a preferred example, the image recognition technique can be a feature-based recognition algorithm, such as SIFT, and a matching technique. An example of a suitable image recognition system is described in commonly-owned U.S. provisional application 61/856,580, titled "Fast Recognition Algorithm Processing, Systems and Methods", filed Jul. 19, 2013; and US published patent application 2015/0023602 to Wnuk et al. titled "Fast Recognition Algorithm Processing, Systems and Methods", filed Jul. 15, 2014. Both U.S. provisional application 61/856,580 and US 2015/0023602 are incorporated herein by reference in their entirety.

In embodiments, the system 100 can, in addition to the components, functions and processes illustrated in FIG. 1, include some or all of the components and functions (e.g., processors, computer-executable instructions stored in non-transitory memory, dedicated hardware devices, etc.) associated with the initial image recognition. For example, some or all of the system 100 can be contained within the same user device or the same server computing device used to execute image recognition functions. Alternatively, the system 100 can be a stand-alone system, independent of the systems and methods used in the initial image recognition. In this alternative, the system 100 can receive information regarding the image recognition process results directly from an image recognition system, or from another device (e.g., the user's device, another intermediary computing device), via a data communication network.

In addition to the information associated with candidate images described above, the returned candidate images 104 can also include a match or confidence score representing the degree of similarity between the candidate and the query image or a confidence in the match of the individual candidate with the query image. In the example of FIG. 1, the group of candidate images 104 is illustrated as having candidate images labeled A-D. In embodiments, the candidate images can be ranked, such as according to their similarity to the query image 103 as determined by the image recognition process. The ranking can be according to the match score, the confidence score, Euclidean distance in descriptor space, or other metric that allows for the images to be ranked, categorized or otherwise organized according to their similarity with the query image 103. For this example, the candidate images 104 are shown as having been ranked in descending order according to an image recognition match score, with candidate image A having the highest match score and the candidate image D having the lowest match score.

After the initial image recognition is performed, and the candidate images 104 have been identified and retrieved from the candidate database 102, the candidate images 104 and optionally, the query image 103, are received by the verification engine 101.

At step 110, the verification engine 101 selects a verification technique. The verification technique can be thought of as a collection of implementations of one or more techniques that the verification engine 101 uses to perform functions associated with the verification of an image recognition result (i.e., returned candidate images 104). The verification technique can include at least one image processing techniques and at least one matching technique. In embodiments, the image processing and matching techniques available to the verification engine 101 can be integral to the verification engine 101. In embodiments, the image processing and matching techniques can be separate applications executable by the verification engine 101. These applications can be stored locally or remotely to the verification engine 101, and retrieved as necessary for execution. The image processing and matching techniques can also have information representing characteristics or features of each technique, as well as categorization information, classification information, and other identification information that can be used by the verification engine 101 to identify techniques during selection.

The image processing techniques can include techniques such as implementations of a feature detection algorithm, an edge detection algorithm, a corner detection algorithm, a depth estimation determination algorithm, a focal length estimation algorithm, a camera intrinsics estimation algorithm, a character recognition algorithm, an energy map algorithm, a self-similarity algorithm, a GIST descriptor algorithm, an RGB color space algorithm, a LAB color space algorithm, an HSV color space algorithm, a gray-scale algorithm, a FAST algorithm, a DAISY algorithm, a FREAK algorithm, a SURF algorithm, a BRISK algorithm, an ASR algorithm, an OCR algorithm, a Gaussian pyramid algorithm, or other types of algorithms including those yet to be invented. Many implementations of such algorithms can be found in the OpenCV project (see URL opencv.org) among other open source or purchasable products.

Examples of matching techniques include a correlation algorithm, a normalized cross-correlation ("NCC") algorithm, a mutual information algorithm, an FFT algorithm, a histogram matching algorithm, a Hausdorff distance algorithm, a mean squares similarity measure or a pattern intensity similarity/dissimilarity measure. Matching techniques may further comprise other image similarity measures (e.g., Tanimoto, stochastic sign change, deterministic sign change, minimum ratio, Spearman's Rho, Kendall's Tau, greatest deviation, ordinal, correlation ratio, energy of joint probability distribution, material similarity, Shannon mutual information, Rényi mutual information, Tsallis mutual information, and F-information similarity measures) or image dissimilarity measures (e.g., L1 norm, median of absolute differences, square L2 norm, median of square differences, normalized square L2 norm, incremental sign distance, intensity-ratio variance, intensity-mapping-ratio variance, rank distance, and joint entropy dissimilarity measures).

The verification engine 101 can select the verification technique in a number of ways. In embodiments, the verification technique (i.e., each of the image processing techniques and matching techniques in the verification technique) can be selected based on at least one of the returned candidate images 104. The verification technique can be selected based on one or more characteristics of one or more of the candidate images 104, such as the characteristics of a candidate image represented by the additional information described above. In an illustrative example, one or more of these characteristics of a particular candidate image can be mapped to one or more image processing and/or matching techniques, and the verification technique (e.g., the image processing and matching techniques) selected based on the results of the mapping for a particular candidate image. As such, a different verification technique can be selected for each candidate image, based on the suitability of image processing and/or matching techniques for each individual candidate image. In another example, the verification technique can be selected according to the match score or confidence score of each returned candidate. In an aspect of this example, candidate images having higher scores can be considered to not require as thorough verification as candidate images having lower scores. As such, the verification techniques selected for higher confidence scores (i.e. either relatively high, relative to other images in the returned set 104, or objectively high, as viewed against a predetermined scoring system) can be those that return a verification result faster than more 'intensive' verification techniques appropriate for lower scores, those that can be performed locally versus requiring handing off to a remote device for processing, those that have a lower computational cost, etc. In a further aspect of this example, the confidence score of a candidate can be compared against a threshold, such that for a sufficiently high score, a "minimal" verification technique is selected or no verification is performed at all unless other conditions are met (e.g., if more than one candidate exceeds the threshold, indicating more than one extremely close possible match for the query, etc.).

In embodiments, certain characteristics of one or more of the candidate images 104 can be given added weighted considerations or can be considered "trump" characteristics of other images in determining the verification technique. For example, a person could be requesting image recognition of a medication bottle corresponding to a prescription medication that they have to take. Prescription medication is typically dispensed in containers that are all very similar, and thus misidentifying a medication container can lead to mismanagement of medication (e.g., insufficient dosage, overdosing, etc.). Thus, it is critical in this case that the verification process correctly verify the match from the initial recognition, even if the verification process used for this type of image would typically be less robust (and, consequently, faster to process or easier on system resources). In this example, if among a set of candidate images 104 there are one or more images of prescription medication (having corresponding information identifying them as such and having information associated with the type of medication, etc.), then the verification engine 101 can give the "medication" identification information greater weight or have them be "trump" categories of information and select the verification technique based solely or primarily on the "medication" categories of information.

In another example, the verification engine 101 can select the verification technique based on a similarity or difference between the returned candidate images. The similarity between the returned set of candidate images can be ascertained according to a predetermined similarity among the images, by comparing the recognition match scores of each candidate with the query image, by an analysis of each image's characteristics relative to the image characteristics of other candidates in a group (such as via mapping, cluster analysis, or other statistical analysis), or by performing matching analysis between the images in the returned candidate set.

In embodiments, the verification technique can be selected by the verification engine 101 based on the query image and at least one of the returned candidate images 104. As discussed above, the query image can include some or all of the additional information described above for the candidate images, and can include additional information regarding the query image such as capture device information, user information, capture location, capture device type, capture device specifications, capture device sensor data, capture device orientation, time of image capture, date of image capture, capture environment conditions, image capture device settings, capture device context, user context, image metadata, etc. Thus, the verification technique can be selected as a function of one or more of the query image information and the information associated with one or more of the returned candidate images (e.g. via mapping, cluster analysis, or other type of statistical analysis).

In embodiments, the verification technique can be selected based at least in part on the image recognition techniques used in the initial image recognition process. Depending on the image recognition process used for the initial recognition, the verification engine 101 can select verification techniques suited to overcome deficiencies prone to certain image recognition techniques or processes, to emphasize an economy of computing resources (e.g., to compensate for a computationally-expensive recognition process, to minimize delay due to verification time, etc.), to properly verify a recognition process given known reliabilities, accuracy ranges, or confidence in various image recognition techniques (e.g., selecting a verification technique to verify an image recognition process conducted using an image recognition process of a high confidence versus one of a lower confidence), etc. For example, the SIFT matcher in image recognition does not consider an object's color or overall shape. As such, the selection of a verification technique can include a consideration of techniques that use color and/or structure information to overcome these shortcomings.

In embodiments, the verification engine 101 can select a verification technique at least in part based on information associated with the candidate database 102. In these embodiments, information about the candidate database 102 can be provided to the verification engine 101 a priori (e.g., during the integration of the candidate database 102 as an available source of candidate images within the system 100) or returned with the returned candidate images 104 (for example, at step 402 of the illustrative example of FIG. 4). Where the information about the candidate database 102 is provided with the candidate images, the information can be transmitted as part of a transmission along with one or more of the candidate images 104. Alternatively, the information can be embedded into one or more of the candidate images 104 themselves (e.g., as metadata, a signature, or other type of identifier).

Information about the candidate database 102 can include information about the database itself, such as a database identifier, a database information address, a database network address, a database network connection status (e.g., bandwidth and other information indicating a database's ability to exchange data), and a database owner/administrator identifier. Additionally and/or alternatively, information about the candidate database 102 can also include information about the contents of the database, such as image file types, image file names, image categories, product types, product names, product families, brand names, number of images contained, image themes, color themes, image update information, image quality (e.g., resolution range of images, minimum image quality metrics among all images contained in the database, etc.), image characteristics, and other image file indexing and organizational information.

The availability of information regarding the candidate database 102 allows the verification engine 101 to select the verification technique that can be considered to be "most appropriate" for the candidate database 102 (and thus, for the returned candidate images 104), such that the accuracy and efficiency of the verification technique is maximized balancing against potential errors or inaccuracies in analysis caused by unknowns.

For example, a first database can be known to contain images of a particular product family based on database information indicating as such. In this case, the verification engine 101 can select the verification technique best suited for the product family (e.g., based on the packaging used in the product family, colors, imagery typically used in the product family, logos, amount and type of text content common to that product family, etc.). An example of this type of database can include a database controlled by a service provider providing the image recognition technology, carefully curated and organized, possibly domain specific, to maximize the efficiency of the initial recognition and subsequent verification.

Continuing with the example, a second database can be one that is run by a third party or organization whereby the levels of care and detail regarding the maintenance of the database and organization of the database contents may be less reliable, and thereby the information about the database and the contents of the database less available to the verification engine 101. For this type of database, where there may be little to no organization of content, and where many images of various sources, quality, and types can be thrown together, the verification engine 101 can select the verification technique appropriate for the database. Thus, for "unknown" databases (e.g., having less than a minimal amount of information available to the engine 101), a default verification technique (e.g., NCC verification) can be applied.

It is further contemplated that for these "unknown" databases, a variation threshold between returned candidate images 104 of a set can be employed to determine whether a verification technique is to be used at all. The verification engine 101 can determine whether the initial match score among the first and second "best" candidates returned from the initial image recognition are within a range or amount of variance (for example, 30%). If they are not, the verification engine 101 can determine that additional verification will not be conducted. If the match scores fall within the range, the verification engine 101 can proceed to selecting a verification technique as described above (e.g., use the "default" for the database, or select one according to the techniques described herein).

Depending on verification techniques used, various differences between two or more images could be missed because of the characteristics (and therefore relative strengths and weaknesses) associated with each image processing technique and with each matching technique. An inability to distinguish these differences can lead to a verification of an incorrect candidate image as a match for a query image and/or a failure to properly verify an appropriate match from within a candidate image set as the verified match. Thus, in embodiments, the verification engine 101 can select the verification technique by using one or more confusion matrices. A confusion matrix can be considered a methodology that can be used to analyze a reference image set (e.g., a reference image set of a product family) to determine one or more matching techniques to be used in verification. For each image verification technique, a confusion matrix can be generated for a given reference image set such that a degree of similarity (e.g., a likelihood or degree of confusion) is calculated for every pairing of images within the reference image set. Thus, for a given image reference image set, a confusion matrix is generated for a NCC-based verification technique, a mutual information-based verification technique, a histogram matching-based verification technique, a FFT-based verification technique, etc. In embodiments employing one or more confusion matrices, the confusion matrices can be stored on a dedicated database or can be stored along with the reference images to which they pertain in database 102.

Figure 2:
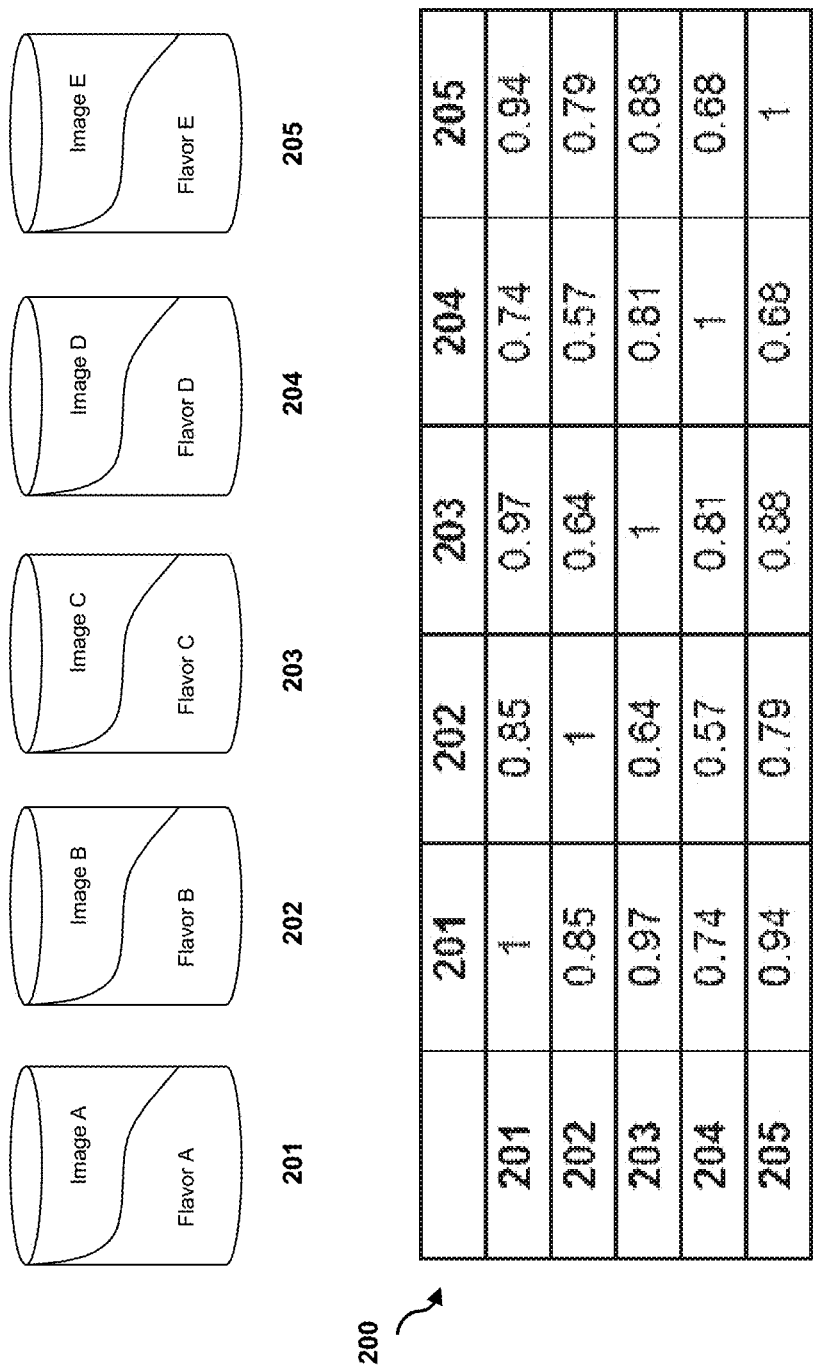
FIG. 2 provides an illustrative example of a confusion matrix employed according to an aspect of the inventive subject matter.

FIG. 2 is an illustrative example of a confusion matrix 200 used for a family of soup products, depicted by reference images 201-205. As shown in FIG. 2, a family or brand of products can share similarities or commonalities in appearance that help identify each of the members of the family as part of the family or brand. For example, a family of soup products may have similar arrangements of imagery depicting the product in terms of placement on the can (e.g., placement of "Image A"-"Image E" on cans 201-205, respectively), have similar typeface (e.g., fonts, styles, etc.) and placement of the indication of the flavor or type of the soup on the can (e.g., the placement of "Flavor A"-"Flavor E" on cans 201-205, respectively), and other similar design elements (e.g., similarly-shaped sections of color on the can, a defined set or range of colors or color schemes used across all products in the family, etc.). For the purposes of the example, the confusion matrix 200 is considered to be a confusion matrix for the family of soup products according to a NCC-based verification technique. Thus, the confusion matrix 200 shows, for each pairing of cans 201-205, a calculated similarity (and thus, likelihood of confusion) between the images using the NCC-based verification technique. In this example, images (i.e. soup cans) 201 and 202 show a calculated similarity of "0.85", images 201 and 203 have a calculated similarity of "0.97", whereas images 202 and 204 show a calculated similarity of "0.57". Because the calculated similarity is representative of a likelihood of confusion, a higher score indicates that the verification technique (in this example, NCC-based) is more likely to confuse (or be unable to distinguish between) two images. In other words, a lower similarity is better. Thus, in this example, the confusion matrix 200 shows that the NCC-based verification technique is relatively unlikely to confuse images 202 and 204 but highly likely to confuse images 201 and 203. As shown in FIG. 2, the confusion matrix 200 is illustrated as applicable to a family of five products for the purposes of simplicity. It is contemplated that a confusion matrix 200 can correspond to a group of identifiable objects of any desired practical size (e.g., tens of products, hundreds of products, etc.).

The confusion matrix to be used in selecting a verification technique can be selected based on the query image 103 and/or one or more of the returned candidate images 104. In embodiments, the verification engine 101 can select the confusion matrix at least in part based on information associated with the query image 103. For example, based on the location information of the query image 103, can select one or more confusion matrices applicable to items (e.g., objects, products, etc.) more likely to be found at that location. In a variation of the example, the location information of the query image 103 can be used to rule out confusion matrices that are highly likely to be inapplicable. In the soup example of FIG. 2, this can be used to rule out confusion matrices associated with soups that are not sold in the region corresponding to the location information of the query image 103. This selection process can be iterative, where an initial selection can be of a plurality of matrices, and whereby repetition of the process and/or invocation of other selection process can be used to narrow the selection process down to one confusion matrix or a usable set of confusion matrices to use in selecting the verification technique(s).

In embodiments, the verification engine 101 can select the confusion matrix based on the candidate image selected as the closest match in initial recognition (i.e., based on the product, family, class, category, etc. of the closest match). In embodiments, the confusion matrix can be selected based on two or more candidate images from the candidate set 104 determined to be most similar among the candidate set (e.g., identified belonging to a same family, class, category, etc.). In embodiments, the verification engine 101 can select a confusion matrix based on the greatest number of candidate images from the set 104 corresponding to a particular confusion matrix. In embodiments, more than one confusion matrix corresponding to more than one grouping (e.g. more than one product family or other organized grouping) can be selected, such as if the candidate images 104 correspond to products from different (but similar-looking) product families or if there are two equal (or nearly equal within a desired percentage of similarity) top candidates within the image set 104. It is further contemplated that the selection of a selection matrix can be based both on the query image 103 and images from the candidate set 104, using a combination of the processes described herein.

In embodiments, the system 100 can include a plurality of heirarchical candidate matrices for one or more verification techniques, such that each level of the hierarchy corresponds to a different level of granularity with respect to the images of the corresponding candidate matrix. Thus, a hierarchy can include levels from a most granular (e.g., product family) to a least granular (e.g. images having generally the same shape, color, etc.). For example, at the lowest level (i.e., the "most granular") of a hierarchy, the confusion matrix can be the confusion matrix 200 of FIG. 2 that corresponds to a product family of soup products, possibly part of the same brand. The next level in the hierarchy could be a confusion matrix including soup cans from the product family and from other brands. A level beyond that can include soup cans and non-soup cans, and so on. At a highest level, the confusion matrix could include a group of images depicting cylindrical shapes generally, food items generally, or other high-level groupings of items. The hierarchy of confusion matrices can be linear or can include branches such that for a particular level, there can be a plurality of confusion matrices providing different groupings of images to a particular level of granularity. Thus, whereas one confusion matrix of a particular hierarchy level can be arranged according to images of similar shapes, another confusion matrix of the same level of granularity can include a group of images of a similar color (e.g., but independent of shape similarities).

In embodiments, it is possible that more than one confusion matrix is deemed applicable to a candidate set and thus, more than one verification technique can potentially be used. In these embodiments, the verification techniques can be carried out independently and the results compared to re-rank, reorder or otherwise reclassify the candidate images, and to verify a match. In alternative embodiments, a metric fusion of the verification techniques can be performed. For example, the metric fusion can be performed according via learning functions such as support vector machines ("SVMs"), boosting, or binary classification algorithms. In other examples, the metric fusion can be performed based at least in part by determining weights or distances of the verification techniques involved in the fusion.

In embodiments, the verification engine 101 can select a first portion of the verification technique (i.e. one of the image processing technique and the matching technique), and select the other portion of the verification technique (i.e., the other of the image processing technique and the matching technique) based at least in part on the selected first portion of the verification technique. For example, certain matching techniques can be preferred in situations involving certain image processing techniques, and vice versa. As such, image processing and matching techniques can be paired or otherwise mapped together (such as according to features or characteristics of the image processing and matching techniques) whereby the selection of one of the image processing and matching techniques results in the selection of a corresponding other of the matching or image processing technique. For example, corner map and edge map image processing techniques can be paired with a Hausdorff distance matching technique, energy map and self-similarity image processing techniques can be paired with a NCC matching technique and a GIST descriptor image processing technique can be paired with error distance matching techniques. Where a particular first portion technique (i.e. a selected image processing or matching technique) is suitable for use with a plurality of second portion techniques (i.e., matching or image processing techniques), the selection of the appropriate second portion technique can be based on the first portion technique in combination with other factors such as aspects of the candidate images returned, aspects of the query image, aspects associated with the technique used for the image recognition process, etc.

In embodiments, and in addition to the selection criteria and methods described above, the verification technique can be selected based on one or more of an object class, a product family, a cluster of products, color information, shape information, text information, logos, metadata, a frame rate, a hierarchy, a priority, an ontology, an image attribute, image quality of the captured image, a location of the captured image, time information of the captured image, capture device orientation, environmental conditions, capture device motion, capture device sensor data (e.g., accelerometer, GPS, microphone, biometric sensors, motion detection, visual sensors, etc.), a hierarchy, a priority, and an ontology.

At step 111, the verification engine 101 uses the selected verification technique to generate a match score for each of the candidate images 104 based on the query image 103 and each of the candidate images 104, respectively. For each candidate image, the verification engine 101 performs image processing on the candidate image and the query image according to the selected image processing technique, and executes the selected matching technique on the processed versions of the candidate and query images. As described above, a verification technique may be selected and used for a single candidate image, or for more than one candidate image. As such, the query image 103 may be subjected to multiple verification techniques to account for the number of verification techniques selected for the candidates of the returned candidate set 104.

At step 112, the verification engine 101 classifies one or more of the candidate images 104 based on the generated match scores, illustrated collectively as classified candidate images 105. A classification of the images can include the verification engine 101 executing one or more of a confirmation of an initial ranking, a re-ranking of the candidate images, a reordering of the candidate images, and a removal of one or more candidate images from consideration.

In this example, the candidate images 105 have been re-ranked by the verification engine 101 from their original order 104 based on the generated match scores. The classified candidate images 105 now show candidate image C having the highest match score, followed by images B, A, and D. The results of verification can then be returned to the requesting application or device, such as an application or device requesting the initial image recognition. The returned result can comprise only the verified highest-ranked candidate (i.e., confirmed as a "match"), or can additionally include one or more of the other candidates in classified form.

Characteristics of the query image (e.g., poor image quality, distorted, corrupted or otherwise manipulated query image data, color distortions, etc.), the database of the candidate images (e.g., the quality of the database, the images, the information available regarding the images, etc.) and other factors can contribute to poor initial image recognition of a query image, resulting in the creation of a candidate image set without a proper match, and return "false positives" for one or more of the top candidates for query imaging.

To mitigate the risk of false-positive match confirmations, the verification engine 101 can, in embodiments of the inventive subject matter, compare the generated match scores to a threshold necessary for confirmation. The threshold can be an absolute match score that must be met by the highest-ranking candidate such that the candidate can be confirmed as a match, can be a minimum match score "improvement" from the initial image recognition confidence score to the post-verification process match score, a difference in post-verification match score between a highest-scoring candidate and the next highest-scoring candidate, or other suitable thresholds. If the highest-scoring candidate (and, optionally, one or more of the other candidates) does not meet the threshold, the verification engine 101 can resubmit the candidate set for further processing. The additional processing can include one or more of a selection of additional image processing (including selection of new regions of interest to use in the query image, the candidate images, or both) and/or matching techniques, and/or starting over with the original query image and candidates and selecting a different verification technique (e.g. a different image processing technique, a different matching technique, or both) altogether.

The threshold values can be pre-determined or can be dynamically adjusted. In embodiments, the thresholds can be based on a classification of the query image and/or one or more of the images in the candidate set. In embodiments, the thresholds can be based on a characteristic of the query image 103 (e.g., image quality, percentage of one or more candidate images 104 present in the query image, etc.). In embodiments, the thresholds can also/alternatively be based on verification techniques, such that each verification technique can have its own threshold. Threshold scores/values can be multi-dimensional, representing various aspects of one or more of the query image, the candidate set, the image recognition technique used in the initial recognition, and one or more of the available verification techniques that can influence accuracy/precision in the verification, balanced against available computing resources (e.g., processing power, network capacity, etc.) and other performance concerns for a given task. In embodiments, the threshold values can be adjusted according to the size of the candidate image set 104. For example, the threshold values can be adjusted such that, for a set of candidate images 104, a certain percentage of the candidate images 104 or certain number of the candidate images 104 are guaranteed to fail verification and be eliminated as potential candidates.

For example, testing was conducted on candidate images within a model database wherein query images were used to run verification. In the test, the query images were selected such that no match should be confirmed for the candidate images of this particular database. Affine matchers and homography matchers were used in the initial image recognition, and then image verification was performed using verification threshold values. In testing, verification threshold values to verify initial affine matching techniques decreased false positives by about 10%, and decreased false positives of initial recognition using homography matching by about 2%.

In embodiments, the verification of the image recognition results can be performed based on a region of interest ("ROI") of the returned candidate results and a corresponding ROI of the query image. A region of interest can be considered to be a selected region of the image used for the image verification analysis.

The region of interest can be an identified portion of the image that is particularly distinguishable from corresponding portions of other images, even among images having a high degree of similarity. This can be a high-variance region, such as a region where there are likely to be distinguishable differences between the query image and a candidate. For example, a product manufacturer might use nearly uniform packaging for their various products, with only minor differences that allow a customer to ascertain the specific product contained therein; e.g., a flavor of soda. The difference between the packaging of the various products might be limited only to aspects of the packaging such as the actual name of the product printed on the package (e.g., the name of a cheese among various cheese types manufactured, the flavor of a potato chip among various types of potato chips, etc.), or a version of a product (e.g., a low-fat version of a product, an updated version of a product, etc.). In this example, the region of interest can be the region of the image depicting where the name/contents/versions of the product are printed on the package.

Figure 3:
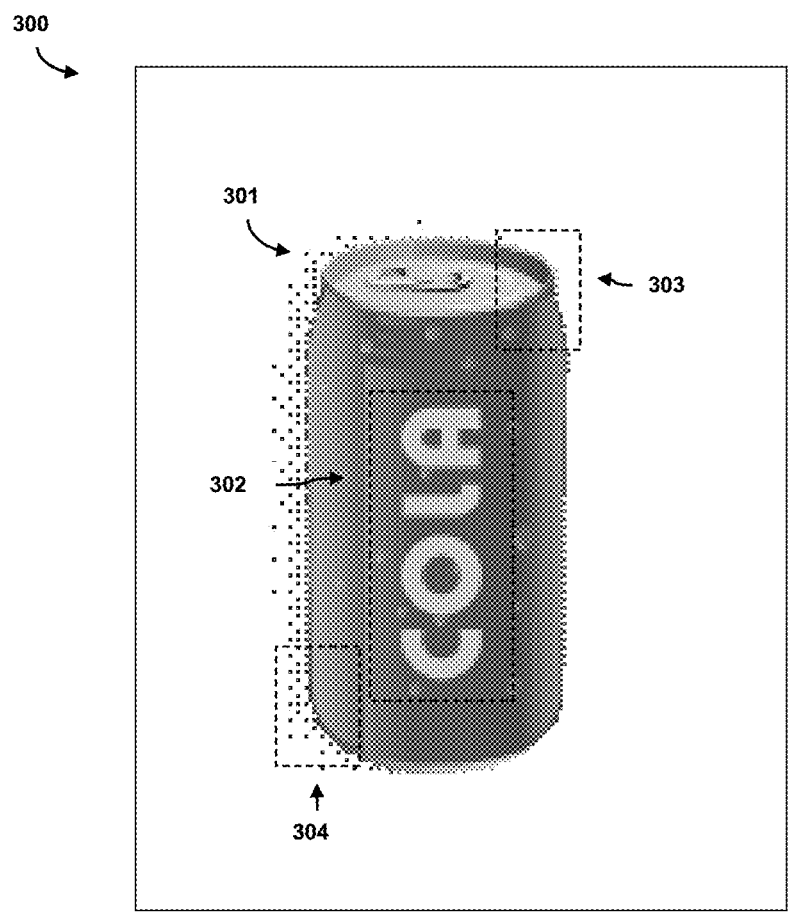
FIG. 3 provides an illustrative example of an image having a plurality of regions of interest.

An image can have one or more ROIs, and ROIs across various images and/or within a same image can be of different sizes and shapes. FIG. 3 provides an illustrative example of an image 300, depicting a cola can 302, with the image 300 having regions of interest 301, 302, and 303.

In the example illustrated in FIG. 3, the ROI 302 is shown as corresponding to the area of the cola can 301 that contains the brand or name of the cola. In a matching analysis, ROI 302 can be used to properly classify match a query image with a candidate image depicting the same cola brand and flavor versus candidate images depicting other colas that are not the cola depicted in the query image (e.g., other flavors from the same brand, other cola brands, other beverages in similarly shaped or colored cans, etc.). ROI 303 is shown as corresponding to the section of the can 301 where the can sides meet the top. This ROI can be employed to verify a match based on the physical can shape and color. Using this ROI, the verification engine 101 can distinguish images of cola cans of this color from cola cans of other colors, that use different can construction, or other cans for other purposes that do not share a shape typical to cola or other beverage cans. If the can 301 is of a brand that employs a distinctive can shape in this region, this ROI can be used to verify matches of cans of the same brand versus candidate images depicting cans of other brands. Many beverage cans contain additional printing, such as nutrition information, ingredients, manufacturer information, etc. ROI 304 is shown to correspond to an area of the can 301 where this information is typically printed, and can be used to provide another source of information for the verification engine 101 to use for matching.

In embodiments, the ROI(s) for each of the returned candidate images 104 can be generated as part of the image recognition process. For example, the use of a SIFT algorithm and matching based on SIFT features of a query image yields a set of image candidates 104, with a corresponding ROI for each of the candidates. This ROI can be indicated by four corners and a homography (or affine) transformation. In another example, the ROI(s) for the returned candidates can be determined by executing a text-detection algorithm on each candidate image, wherein the ROI can be the output of the text detection algorithm.

In embodiments, the ROI(s) can be determined for each of the candidate images stored in database 102 prior to their selection as candidates in image recognition. For example, the ROI(s) for each candidate image can be determined during database construction, as candidate images are added to the database 102. The ROIs for the images within database 102 can be identified by executing image recognition and/or matching techniques on candidate images that are known to share similarities (e.g., they depict the same product, same product family, same brand, same object class, etc.).

Figure 4:
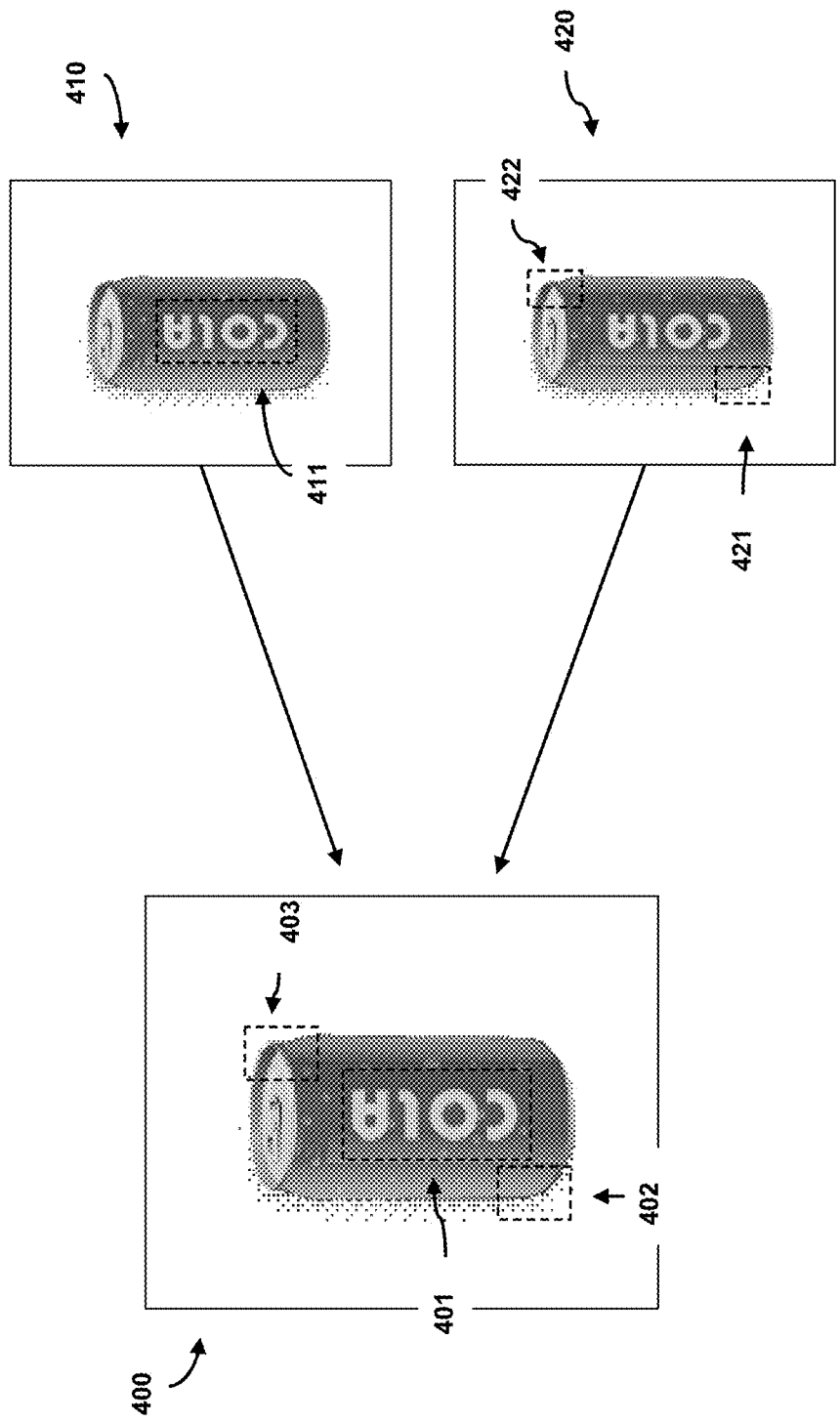
FIG. 4 provides an illustrative example of a query image having a plurality of regions of interest derived from a plurality of candidate images.

In order for the verification engine 101 to use the ROI of the candidate images in the verification analysis, a corresponding ROI in the query image must be identified for each of the candidates. The query image ROI(s) can be determined for each of the candidate images based on the ROI(s) of each respective candidate image. FIG. 4 illustrates a query image 400 having ROIs 401, 402 and 403, derived based on the ROI 411 of candidate image 410 and ROIs 421 and 422 of candidate image 420, respectively. In the example shown in FIG. 4, only two candidate images 410, 420 with their respective ROIs are shown for the purposes of clarity. However, a returned set of candidate images can include more candidates, each having one or more corresponding ROIs. The ROIs of candidate images can overlap (i.e., multiple candidate images can have the same or similar ROIs), or be unique to a candidate image relative to one or more other candidate images.

As each candidate image can have different ROIs, a corresponding ROI in the query image is generated for each candidate image ROI. As such, in the example of FIG. 4, the ROI 401 is generated based on the ROI 411 of candidate image 410. For candidate image 420, ROIs 402 and 403 are generated based on ROIs 421 and 422, respectively.

The query image ROI can be generated by matching the location of the candidate image ROI relative to the candidate image as a whole to the query image. In another example, the query image ROI can be generated based on feature-based matching (such as via SIFT) of the candidate image ROI to the query image. The generation of query image ROI(s) can be performed during the image recognition process, as an independent step between the image recognition process and the verification process, or at the start of the verification process.

In embodiments, the ROIs 401-403 can be generated for all returned candidate images using the same query image 400. In embodiments, image processing techniques can be applied to one or more of the query image 400 and the returned candidate images prior to the ROI generation, creating multiple versions The number of ROIs within an image, their sizes, shapes, and their locations within the image can be based on one or more of characteristics associated with the image (e.g., image contents, size, color, hue, speculation, resolution, image quality, image data type, frame rate, etc., of the image), the image recognition algorithms used in the initial recognition, the image processing technique used in verification, and the matching technique used in verification.

In embodiments, the number and characteristics of the ROI(s) used can depend on a match score associated with the initial image recognition process, representing a confidence or similarity between a query image and a particular candidate image returned.

In embodiments, the number and characteristics of the ROI(s) used can depend on a similarity between the returned set of candidate images themselves. For example, if the returned candidate images are found to be very different (e.g., they depict different products, or different classes of objects), the selected ROI(s) can be those that allow for matching with a candidate image on a broad level, as it may not be necessary to match each candidate to the query image on a granular or detailed level to properly reclassify them. In contrast, if the returned candidate images are all very similar, the ROI(s) to be used can be those that enable matching on a very detailed level, so as to properly classify the candidates based on their subtle, granular differences. In embodiments, the similarity between the returned set of candidate images can be ascertained according to a predetermined similarity among the images. In embodiments, the similarity between the candidate images can be determined by comparing the match scores of each candidate with the query image, or by performing matching between the images in the returned candidate set.

In embodiments, the verification engine 101 can perform verification functions using signatures of the images. In these embodiments, the image processing techniques used in the verification technique can include generating the signature of an image. The signature of an image can be considered to be a down-sampled version of the image.

The signatures for candidate images stored in the candidate database 102 can be generated as the candidate images are added to the database, and stored for later use. Alternatively, the signatures can be generated "on the fly" or in real-time for candidate images returned from the image recognition process, such as the set of candidate images 104. For a query image, such as query image 103, one or more signatures can be similarly be generated for use in the verification analysis. The signatures can be generated for one or more of the query image and the returned candidate (i.e., in embodiments where the candidate signatures are generated "one the fly") as part of the image recognition process, entirely by the verification engine 101 as part of the verification analysis, or split between the image recognition process and the verification engine 101.

The type of image signature that is generated can depend on the verification technique to be used. For example, a color down-sampled version of the images can be used when using an NCC technique (e.g., 32×32 pixels or other desired size), a down-sampled version of the images can be used for rigid and non-rigid registration identifiers (e.g. 32×32 pixels, or other desired size), quantized color histogram bins (e.g., a vector of 16 or 32 numbers) can be used as the signature for a color-histogram-distance technique, and an edge or corner map (such as a binary map) can be used for the Hausdorff-distance technique.

The image signature for an image is preferably generated for the entire image. In generating down-sampled versions of images as signatures, the downs-sampling of the image can be performed such that the down-sampled version of an image is of a size and resolution that can be used for the matching technique during the verification analysis.

In embodiments using ROIs for the purposes of the matching analysis, the images can be down-sampled such that the ROI(s) of an image signature are of a sufficient size to be usable in the matching analysis. For example, for verification using NCC, the image is down-sampled such that the image signature is a 32×32 pixel thumbnail of the ROI. As images can have more than one ROI, having varying sizes and shapes, an image may require down-sampling to several different sizes. This can be performed using a Gaussian pyramid on the original image, which results in a "pyramid" having a series of generated down-sampled images of varying sizes, corresponding to different pyramid levels. The images having the ROI of a desired size are then selected, and the ROI used. In the example using NCC, an image of a pyramid level would be selected having a desired ROI slightly larger than 32×32 pixels would be selected for use as the image for that particular ROI. If, in the example, the image has two ROI, a signature image for the first ROI can correspond to that of a first pyramid level and the signature image for the second ROI can correspond to that of a different pyramid level.

In embodiments, the query image can be skewed or otherwise misaligned relative to the candidate images, wherein the query image (and thus, the objects depicted in the query image) are not in the same orientation as the candidate images (i.e., not in "canonical" form). When this occurs, the verification engine 101 can use one or more rectification algorithms to "warp" the query image 101 into canonical form, such that the matching analysis may be performed. The warping can include image rotation, changes in image dimensions, aspect ratio, and a modification to an image characteristic (e.g., color, contrast, brightness, etc.) such that the query image is consistent with the canonical form of the candidate images. An example of a rectification algorithm is an efficient second-order minimization algorithm ("ESM").

The warping process is preferably performed on the query image as it is used in the matching analysis portion of verification. As such, the warping process can be performed only for the sections of the query image in the matching analysis. For verification techniques using ROIs for matching, the warping is only performed on the ROI(s) of a query image. The warping process requires the four corners and transformation (homography or affine) of the query image for each candidate image to be matched. As such, the warping process can be performed on the query image separately for each corresponding candidate image, or for each ROI of each candidate.

In embodiments where signatures are generated for query images and candidate images, the signatures of the query images are warped to fit with the proper, canonical form of the candidate image signature. This can be combined with the ROI warping described above, where the signatures of the ROIs are warped according to the ROIs of the signatures of the candidates.

Figure 5:
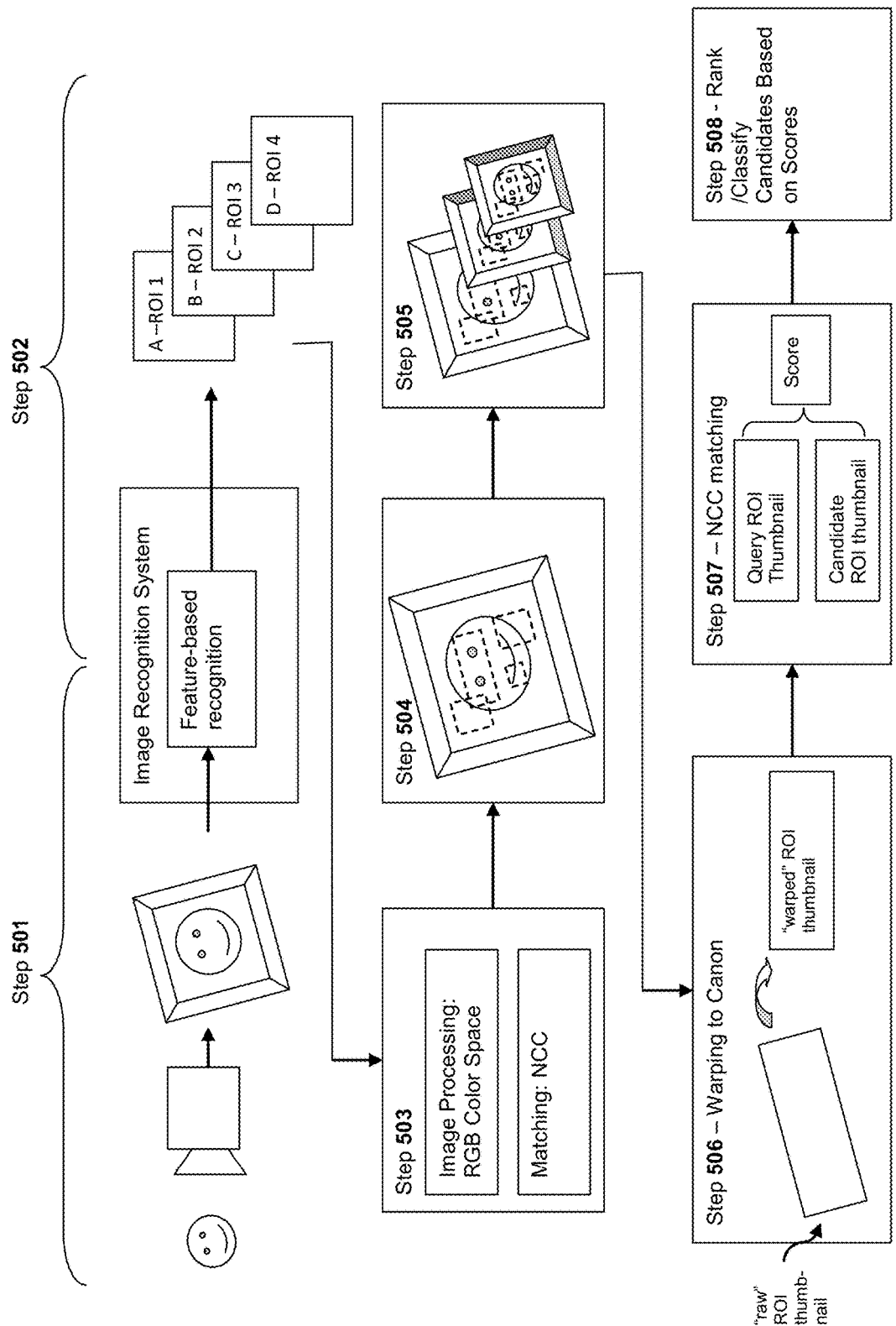
FIG. 5 provides an overview of an example verification process that incorporates both the region-of-interest and signature generation features of the inventive subject matter.

FIG. 5 provides an illustrative example of the image verification process, incorporating both the ROI and signature generation techniques into the verification analysis.

At step 501, a query image, such as an image taken by a cellular phone camera, is received by a recognition server for image recognition.

At step 502, an image recognition system implements a feature-based algorithm (in this example, SIFT) and returns a plurality of candidate images from a candidate image database, such as candidate database 102, where each candidate image has a corresponding region of interest ("ROI"). In this example, the ROIs of the candidate are considered to be previously generated and stored in the candidate database 102, and are returned with each corresponding candidate image. Also, in this example, the candidate images can include the image signature version of the candidate necessary for the various possible matching methods that can be employed, including image signature versions of the ROI as candidate "thumbnails".

At step 503, the verification engine 101 selects and implements a verification technique, according to one or more of the selection criteria described above. In this example, the selected verification technique includes the RGB color space image processing algorithms as the image processing technique and the NCC matching algorithm as the matching technique.

At step 504, the verification engine 101 identifies one or more ROIs (shown as dashed lines in FIG. 5) in the query image corresponding to the respective ROIs of each of the returned candidate images.

At step 505, the verification engine 101 then generates down-sampled signatures for the query image using the Gaussian pyramid technique. This is performed in real time. For each candidate ROI (reflected by a corresponding ROI generated in the query image), the verification engine 101 selects a signature among the generated signatures from the levels of the pyramid such that the identified ROI of the particular down-sampled signature is slightly above a 32×32 pixel size "thumbnail."

At step 506, each ROI thumbnail of the query image (which, again, is from a down-sampled Gaussian pyramid level) is warped into canonical form. In this example, the query image thumbnails are shown as being rotated into proper canonical form orientation. Other warping functions, such as those described above, can be performed as necessary.

At step 507, the verification engine 101 performs NCC analysis on the query image thumbnails and each candidate match thumbnail to generate a match or verifier score.

At step 508, the verification engine 101 ranks, classifies or otherwise sorts the candidate images based on the generated scores. In an alternative, the ranking can be performed based on a fusion metric. In this example, the fusion metric can be generated by the engine 101 based on the NCC score and one or more common features between the query image and the returned candidate images.

It is contemplated that, in addition to the verification based on individual query images, the verification can be performed based on a sequence of query images (e.g., continuous frames of video or sequential set of still images).

In embodiments, the verification engine 101 can receive a sequence of query images whereby the initial image recognition has been performed for all of the query images. Thus, the verification engine 101 will receive a set of corresponding candidate images 104 for each of the query images from the sequence.

For each of the query images, a verification technique can be selected according to the selection methods and techniques described above (such as in step 110 of FIG. 1, and step 503 of FIG. 5). Thus, it is contemplated that each of the query images can be verified by the verification engine 101 using different verification techniques, such as the verification techniques considered to be best suited for each individual query image and/or each corresponding candidate image set from the sequence.

Alternatively, a uniform verification technique can be selected for all of the query images. The verification engine 101 can decide which verification technique to apply uniformly to all query images according to various types of selection criteria. A single selection criterion can be applied to select the uniform verification technique. Alternatively, a combination of various selection criteria can be employed.

In one example, the uniform verification technique can simply be the verification technique selected according to the aspects of the inventive subject matter described above, for the first query image in the sequence, the last query image in the sequence, or a query image somewhere in the sequence, and then applied to all query images in the sequence.

In another example, the uniform verification technique can be selected based on characteristics associated with each query image, such as image quality, image capture conditions, etc.

In a further example, the uniform verification technique can be selected based on the confidence scores associated with the returned candidate images 104 for each query image in the sequence. In this example, the query image having the candidate image with highest confidence score among all of the candidate images for all query images can be the "winner", and the verification technique selected for that query image can be applied to all other query images.

In still another example, the verification engine 101 can select a uniform verification technique based on candidate images common to at least two of the query images from the sequence. In this example, the verification engine 101 can determine whether more than one of the query images share common candidate images among their respective candidate sets 104. The uniform verification technique can be selected based on the query image having the greatest number of common candidate images, the number of query images having the common candidate images, etc. The techniques described for the other examples can be used as tie-breakers if more than one query image fits the selection criteria of this example.

The verification engine 101 can implement the verification techniques for each query image from the sequence as described herein, and generate a match score for each query image and their respective candidate image set 104 (such as in step 111 of FIG. 1 and step 507 of FIG. 5).

In embodiments, the verification engine 101 can aggregate the candidate images 104 from all of the query images, and apply selected verification techniques for each query image for the aggregated candidate image set.

In embodiments, the verification engine 101 can be configured to aggregate candidate images 104 from all of the query images that are common to more than one query image, and apply the selected verification techniques for the query images for the aggregated common candidate images. In a variation of these embodiments, the verification engine 101 can refrain from applying verification techniques to any candidate images that are not common to more than one query image.

Having determined a match score for each query image, the verification engine 101 can use the match scores for each query image to classify, rank, reorder or otherwise confirm the recognition of the real-world object captured across the query images in the sequence.

In one example, the verification engine 101 can select the candidate image having the highest match score among all candidate images corresponding to all the query images as being the verified match or as the re-organized highest ranking match.

In another example, the verification engine 101 can select the candidate image common to more than one query image having the highest match score as the highest-ranking candidate (i.e., the verified recognition). The highest match score for a common image can be a single highest match score with a single query image or a highest average match score across all matches with all query images.

In a further example, the highest scoring candidate images common to more than one image can be aggregated and classified, ranked, or reorganized as a 'verified' candidate set.

In the above examples, match score thresholds can also be used in the verification of recognition for sequential query images.

In embodiments, the verification engine 101 can receive a sequence of images whereby the initial image recognition has been performed for less than all of the images. Thus, the verification engine 101 will receive a set of corresponding candidate images 104 for only the query images from the sequence for which the initial image recognition was performed.

In these embodiments, the image verification can be performed for the plurality of query images via the processes and techniques applied to embodiments where initial recognition and candidate sets have been returned for all of the query images. Additionally, images from the sequence for which recognition has not been performed can be used as a backup or to enhance verification processes. For these images, a verification technique used in verifying a query image (from the sequence) against a set of candidate images can similarly be applied to a previously un-recognized image (i.e., a "non-query image"), via the same returned set of candidate images. The verification engine 101 can determine a consistency in match scores between the query image and one or more non-query images, against the same candidate images for verification. This consistency score can be a similarity of match scores (e.g., within a certain range or percentage of one another), and can be used at least in part to classify, re-rank or otherwise confirm the recognition performed on the query image.

In embodiments, the verification engine 101 can employ feature tracking across a sequence of query images (e.g., frames of a video) to verify an initial recognition. In an aspect of these embodiments, the features can be features derived during the initial recognition for one or more of the query images. Having the features from the initial recognition, the verification engine 101 can select a verification technique whereby the consistency of the features across the sequence of query images can be tracked, and the changes in detected features accounted for.

As discussed above, various typical initial image recognition processes do not consider an object's color information. As such, the selected verification technique may include one or more color space image processing techniques.

In an embodiment, verification engine 101 may be configured to implement a verification technique that includes a color space image processing technique or algorithm. For example, at least a portion of the candidate image may be processed according to at least one color space image processing technique, and the processed candidate image may be compared with a query image of an image recognition search according to at least one matching technique. In some embodiments, the matching technique may be selected, at least in part, based on the color space image processing technique.

The color space image processing technique may include selecting a color channel of a multiple channel color space as an image verification color channel. For example, the multiple channel color space may be a two-channel color space (e.g., an rg chromaticity color space that is a normalized representation of a three-channel RGB color space) or a three-channel color space (e.g., one of an RGB, HSV or YUV color space). Any number of color channels, components or portions of a color space may be selected as image verification color channels. For example, any single color channel, component or portion of a two-channel color space or three-channel color space may be selected and utilized as a verification color channel, such as the R (red) channel of an RGB color space, the G (green) channel of an RGB color space, the V (value) component of an HSV color space, the Y luma component of a YUV color space, or the r portion of an rg chromaticity space. The disclosed techniques also may be adapted for images having a higher number of channels, including six or more channels.

In some embodiments, the verification engine 101 may be configured to implement a color space image processing technique that includes selecting a plurality of color channels of a multiple channel color space as image verification color channels. The selected plurality of color channels may each be equal in size (e.g., have an equal number of pixels) or unequal in size (e.g., have an unequal number of pixels). For example, the R, G and B channels of an RGB color space candidate image may be equal in size and have the same number of pixels, but the U and V chrominance components of a YUV color space candidate image may have, for example, one-fourth the number of pixels of the Y luma component.

In some embodiments, the verification engine 101 may be configured to implement a color space image processing technique that includes selecting a prioritized verification order for the plurality of color channels selected as image verification color channels. For example, prioritized verification may include weighting match results in favor of higher priority verification color channels, or determining a processing order based on the relative priority of verification color channels. In some embodiments, two color channels may be selected from a three-channel color space as image verification color channels, and the two image verification color channels may be prioritized in a selected order. As such, the R and G channels of an RGB color space, the B and R channels of an RGB color space, the V and S components from an HSV color space, or the U and V channels from a YUV color space may be selected from their respective three-channel color spaces as image verification color channels and prioritized in a selected verification priority order. In some embodiments, all three color channels of a three-channel color space may be selected as image verification color channels and prioritized in a selected order for verification purposes. For example, the R, G and B color channels of an RGB color space may be prioritized in a selected order (e.g., B-G-R, or G-B-R) for image verification purposes. Further, color channels of the same size or of different sizes may be selected, and prioritized (e.g., based on size), for verification purposes.

Figure 6:
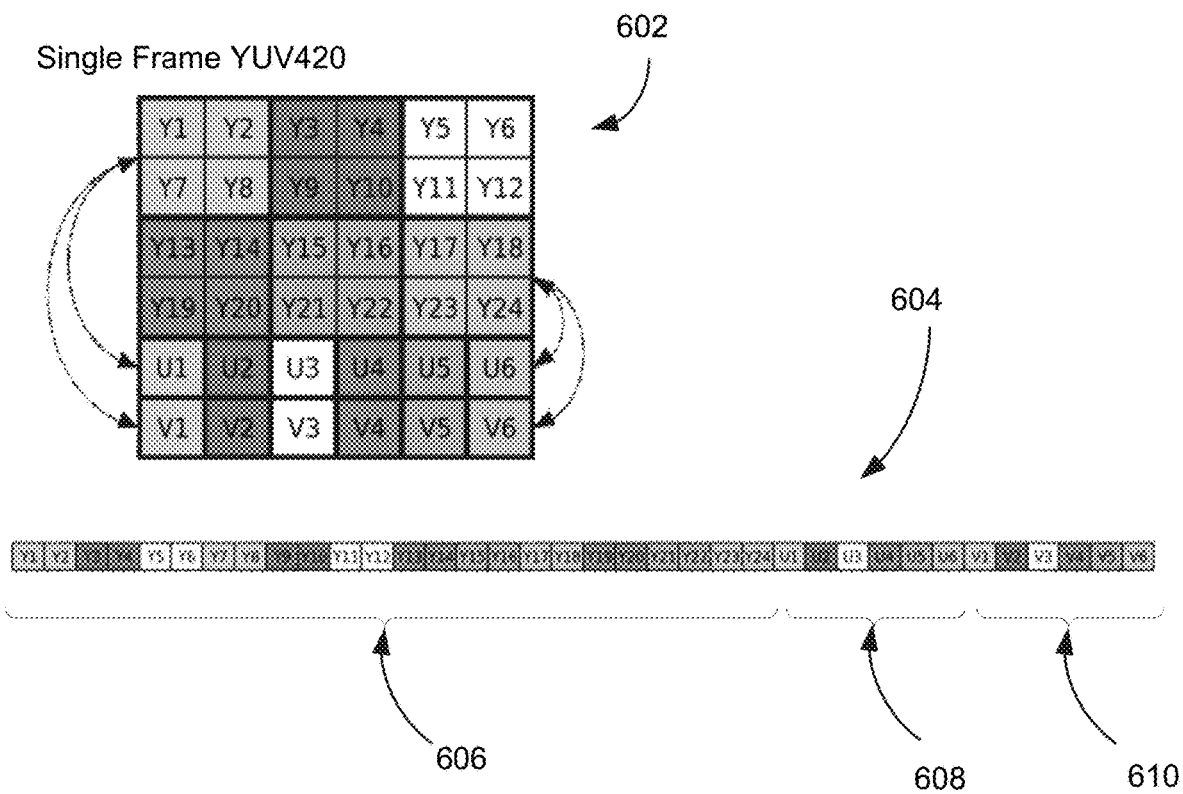
FIG. 6 illustrates a block diagram of a candidate image encoded in memory in accordance with an embodiment.

In an embodiment, the verification engine 101 may be configured to implement a color space image processing technique that includes processing one of interlaced color channel coding and non-interlaced color channel coding from a candidate image. For example, interlaced and non-interlaced color channel coding may be read by determining an offset and skip count for each color channel of a candidate image. As such, the color space image processing technique may include determining an offset and a skip count for each color channel of the candidate image. For example, an RGB color space candidate image may be encoded to have interlaced color channels in memory based on the format: $R_0G_0B_0\ R_1G_1B_1\ R_2G_2B_2\ R_3G_3B_3$. In such case, the R color channel may be identified by $R_{OFFSET}=0$ and $R_{SKIP\_COUNT}=3$; the G color channel may be identified by $G_{OFFSET}=1$ and $G_{SKIP\_COUNT}=3$; and the B color channel may be identified by $B_{OFFSET}=2$ and $B_{Skip\_COUNT}=3$. In another example, an RGB color space candidate image may be encoded to have non-interlaced channels in memory based on the format: $R_0R_1R_2R_3R_4 \ldots R_N\ G_0G_1G_2G_3G_4 \ldots G_N\ B_0B_1B_2B_3B_4 \ldots B_N$, where N is the number of pixels in the color channel. In such case, the R color channel may be identified by $R_{OFFSET}=0$ and $R_{SKIP\_COUNT}=1$; the G color channel may be identified by $G_{OFFSET}=N+1$ and $G_{Skip\_COUNT}=1$; and the B color channel may be identified by $B_{OFFSET}=2N+1$ and $B_{Skip\_COUNT}=1$. FIG. 6 illustrates a block diagram of a candidate image encoded in memory in accordance with an embodiment. In FIG. 6, a single frame 602 of candidate image YUV420 is formatted such that in a non-interlaced byte stream 604, the Y color channel 606 may be identified by $Y_{OFFSET}=0$ and $Y_{SKIP\_COUNT}=1$; the U color channel 608 may be identified by $U_{OFFSET}=25$ and $U_{Skip\_COUNT}=1$; and the V color channel 610 may be identified by $V_{OFFSET}=31$ and $V_{Skip\_COUNT}=1$.

Figure 7A:
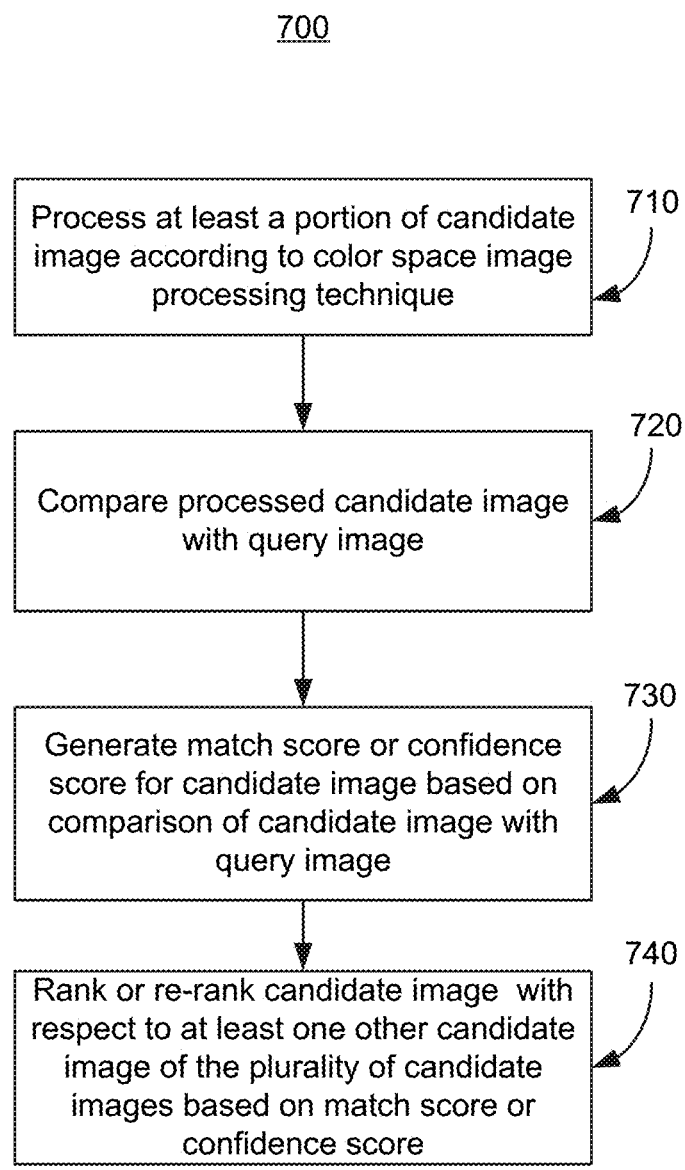
FIG. 7A illustrates a flow diagram of example operations for image recognition verification in accordance with an embodiment.

FIG. 7A illustrates a flow diagram of example operations for image recognition verification in accordance with an embodiment. It should be appreciated that method 700 is executed by one or more computing devices configured to or programmed to have the disclosed roles or responsibilities of a verification engine, such as verification engine 101. For example, verification engine 101 may be embodied as a specially programmed processor, hardcoded with instructions that, when executed, cause the processor to execute one or more functions associated herein with verification engine 101. In various embodiments, verification engine 101 may be embodied as one or more circuits configured to execute one or more functions associated herein with verification engine 101.

Step 710 processes at least a portion of a candidate image of the plurality of candidate images according to at least one color space image processing technique or algorithm. In an embodiment, the color space image processing technique may include one or more processing steps, such as shown in FIG. 7B.

Figure 7B:
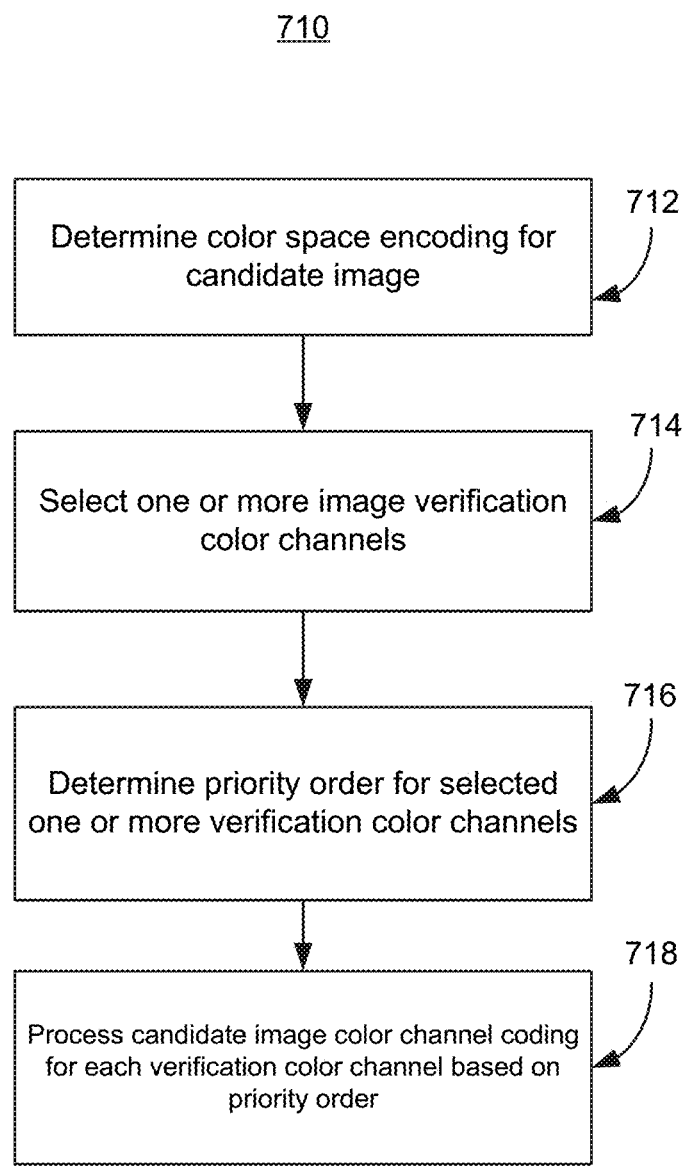
FIG. 7B illustrates a flow diagram of example operations for image recognition verification in accordance with an embodiment.

FIG. 7B illustrates a flow diagram of example operations for image recognition verification in accordance with an embodiment. For example, step 712 determines color space encoding for the candidate image. The candidate image color space encoding may comprise a multiple channel color space, e.g., a two-channel or a three-channel color space. For example, a two-channel color space may be an rg chromaticity color space, while a three-channel color space may be one of an RGB, HSV or YUV color space.

In embodiments where the color space encoding comprises a multiple channel color space, step 714 selects one or more color channels of the multiple channel color space as image verification color channels. The selected one or more image verification color channels may include, for example, the R (red) channel of an RGB color space, the G (green) channel of an RGB color space, the V (value) component of an HSV color space, the Y luma component of a YUV color space, or the r portion of an rg chromaticity space. For example, one or more image verification color channels may be selected based on computational efficiency considerations (e.g., an amount of resources necessary for processing coding for the selected one or more channels.

In embodiments where a plurality of image verification color channels are selected, step 716 determines a prioritized verification order for the plurality of image verification color channels. For example, the R, G and B color channels of an RGB color space may be selected as image verification color channels and prioritized in a selected order (e.g., B-G-R, or G-B-R) for image verification purposes. Likewise, color channels of different sizes may be prioritized (e.g., based on size) in a selected order for verification purposes. In some embodiments, the prioritized verification order may be determined based on computational efficiency considerations, such as an amount of computational resources necessary for processing coding for the selected one or more channels. As such, a verification channel requiring a relatively lower amount of computational resources for processing may be prioritized higher (or lower) relative to a verification channel requiring a relatively higher amount of computational resources for processing.

Step 718 processes the candidate image color channel coding for each verification color channel based on the priority order. For example, processing the color channel coding may include processing one of interlaced color channel coding and non-interlaced color channel coding from a candidate image, such as illustrated in FIG. 6.

Referring back to FIG. 7A, step 720 compares the processed candidate image with a query image of an image recognition search according to at least one matching technique. In some embodiments, at least a portion of the query image may be processed according to the at least one color space image processing technique prior to the comparison with the candidate image. In addition, in some embodiments the matching technique may be selected, at least in part, based on the color space image processing technique. For example, the at least one matching technique may include a correlation algorithm, a normalized cross-correlation ("NCC") algorithm, a mutual information algorithm, an FFT algorithm, a histogram matching algorithm or a Hausdorff distance algorithm.

Step 730 generates a match score or confidence score for the candidate image based on the comparison of the candidate image with the query image. For example, a candidate image having higher a match score or confidence score may not require as thorough a verification as a candidate image having a lower match score or confidence score. In another example, the match score or confidence score of the candidate image may be compared to a threshold, such that for a sufficiently high score, a relatively minimal additional verification technique may be selected to be performed on the candidate image.

Step 740 ranks or re-ranks the candidate image with respect to at least one other candidate image of the plurality of candidate images based on the match score or confidence score. For example, the plurality of candidate images may be re-ranked from an original order based on their respective match scores or confidence scores generated based on the at least one color space image processing technique.

As discussed above, it is possible that none of the candidate images 104 returned by the initial image recognition process correspond to an actual match with the query image, resulting in "false positives". One possible cause of false positives is that the query image fails to provide sufficient information to return a candidate results set that includes a positive match.

In these cases, the verification engine 101 can use an area in one or more of the candidate images that is visible in the query image to determine a behavior or to give a confidence score. The behavior determined can be, for example, that the image capture device gathering the query image is too close to the object it is trying to recognize such that positive recognition of the object cannot be made.

Figure 8:
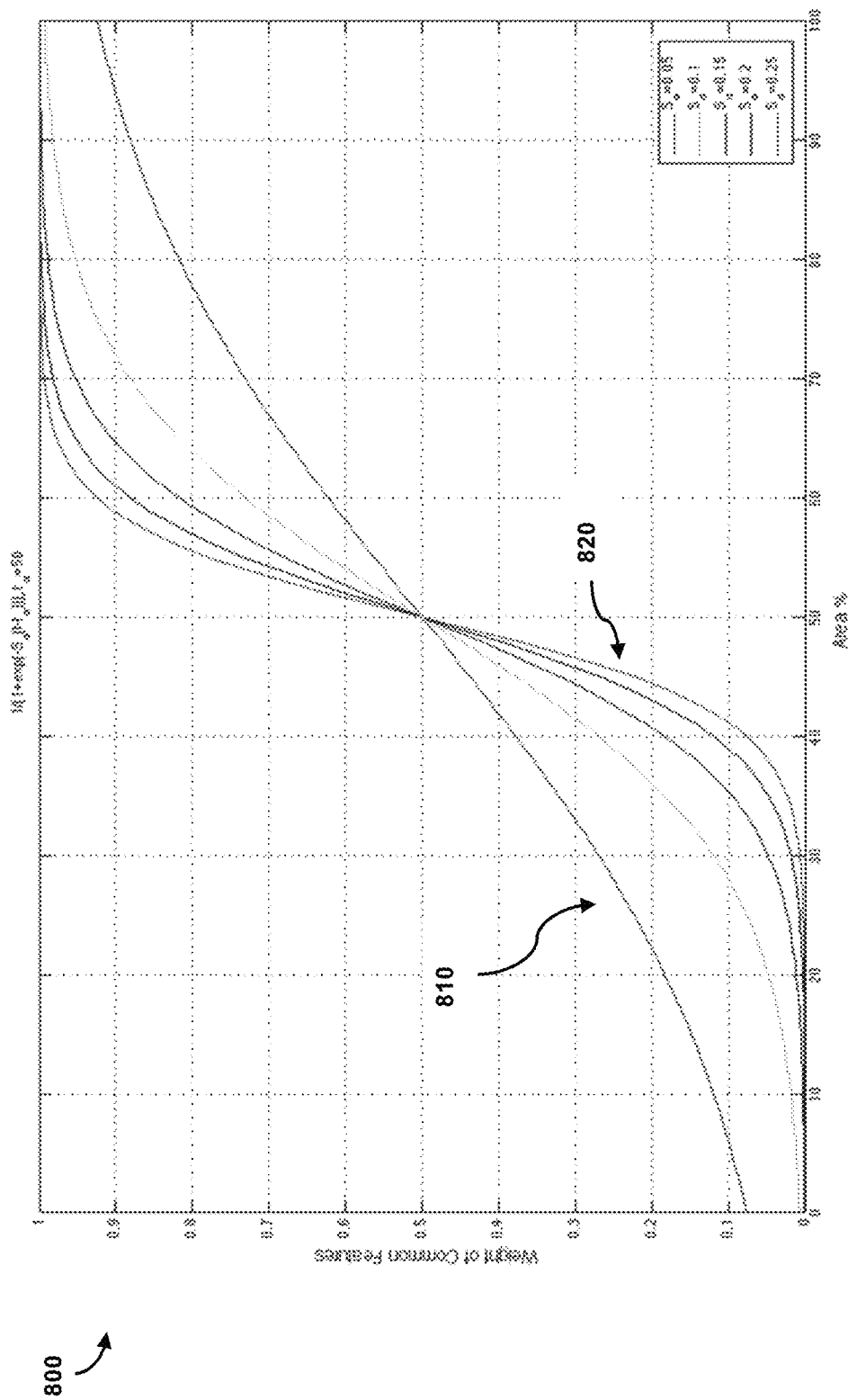
FIG. 8 provides an illustrative example of a sigmoid function for selecting a verification technique based on the portion of a candidate or reference image depicted in a query image.

To determine a confidence score, the verification engine 101 can use a sigmoid function as a weighting function. FIG. 8 provides an illustrative example of a sigmoid function according to aspects of the inventive subject matter. The sigmoid curve of FIG. 8 is used to determine an acceptable percentage of one or more candidate images is visible in the query image 103 based on the weight of common features according to each verification technique. As shown in FIG. 8, each of the curves of the graph can represent to a different verification technique. For example, curve 810 can correspond to a first verification technique and curve 820 can correspond to a second verification technique. For a particular candidate image, a particular weight of common features can be considered a "cut-off" for at least a minimum amount of confidence in the verification to verify as a match. In the example of FIG. 8, if the weight of common features for acceptability is 0.5, then 50% of the image is required no matter what verification technique is used. However, if a particular image requires a different weight of common features (e.g., 0.4), then the amount of the image required by a particular verification technique can depend on the slope of the curve for that particular verification technique. In the example of FIG. 8, for a minimum weight of 0.4, the verification technique of curve 810 requires about 40% of the image to be usable. The verification technique of curve 820, on the other hand, has a sharp drop and still requires nearly 50% of the image to be usable. Thus, the verification engine 101 can selected verification technique for a verification where the query image 103 corresponds to a portion of a candidate image based on the amount of the candidate images depicted by the query image 103. This selection can also incorporate one or more of the other selection techniques and factors described herein.

In embodiments, the verification engine 101 can provide feedback to a user such that a better query image can be captured for analysis, such as via the capture device's screen, audio output, or other output interface of the device. The feedback can include directions that result in a better query image for recognition, such as instructions to better position the capture device relative to the real-world object to be recognized, directions to improve the conditions of the capture device's environment, etc.

For a query image whereby an initial recognition cannot be determined or verified due to a lack of information in the query image, the confidence score for each candidate image can be determined by the verification engine 101 using the sigmoid function as in FIG. 8. The confidence score can be used to narrow the candidate set to a reduced set of possible matches, or obtain a new candidate set.

Figure 9:
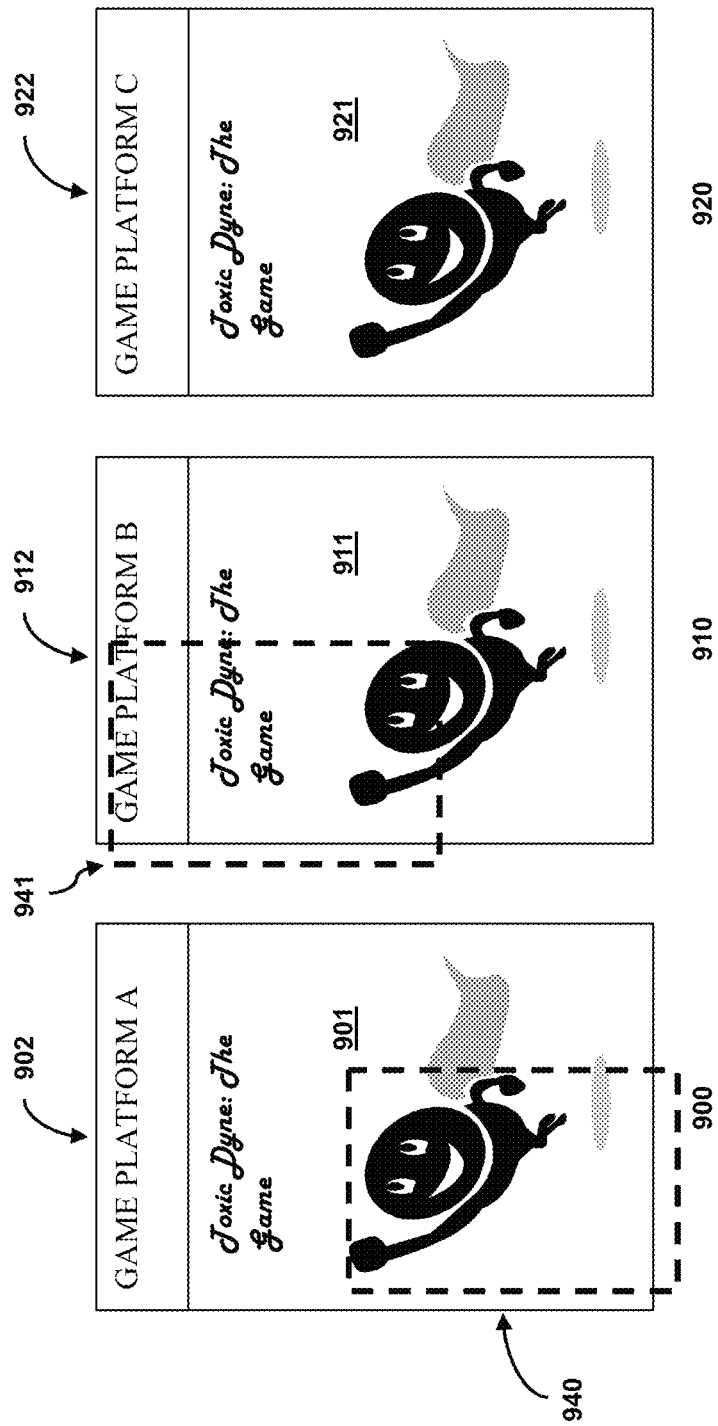
FIG. 9 provides an illustrative example of functions employed for image verification where an initial query image provides insufficient information for verification.

In an illustrative example, it is common for video game titles to be available on more than one gaming platform, so that the video game publisher can reach the greatest number of players possible. To recognize the video game via the systems and methods associated with the inventive subject matter, a reference image database can contain a plurality reference images corresponding to the different cross-platform versions of the same game, including reference images 900, 910, 920 illustrated in FIG. 9. As shown in FIG. 9, the packaging of the video games 900,910,920 can often be very similar across gaming platforms (e.g., gaming consoles, computing formats, etc.), sharing nearly identical cover art 901, 911, 921 and packaging of similar shapes and sizes. The identification of the particular gaming platform is typically performed via small differences in the overall appearance of the game package. In the example of FIG. 9, the identification of the gaming platform for each version of the video game is provided via a horizontal band 902, 912, 922 at the top of the package.

If the query image used in the initial recognition process corresponded to the area 940 (illustrated via the dotted-line box pattern in FIG. 9), the initial image recognition could return all three of the reference images 900,910,920 within the candidate image set because that section is identical or substantially identical across all three of the video game packages depicted by each of the reference images 900,910, 920. Additionally, it is possible that the initial image recognition would return candidate images corresponding to promotional posters, magazine advertisements, or other objects that are not the actual video game box but that share the same or very similar artwork.

In applying one or more of the verification techniques described herein, the verification engine 101 can rule out potential candidates (e.g., magazine advertisements having additional print that is not in any of the game packaging). However, in this example, it is assumed that this is still not sufficient to confirm exactly which version of the game is being provided in the query image. Thus, the verification engine 101 can indicate to the user that the image capture device should be moved along the game package or back from the game package until a part of one of the horizontal bands 902,912,922 is visible. Because the reduced set of candidate images 900,910,920 all include similarly-positioned differentiators via horizontal bands 902,912,922, respectively, the indications provided to the user can provide an indicator of which direction the capture device should be moved in order to maximize the ability to capture the differentiating aspects of the game package.

The new query image is illustrated via box 941 in FIG. 9 (and can also include additional query images corresponding to captured images for positions between boxes 940,941). As illustrated in this example, the verification engine 101 can employ the functions and processes of the inventive subject matter associated with using a plurality of sequential images to assist in or enhance the verification of the initial recognition.

Having received query image 941 containing the representation of at least a part of the distinguishing horizontal band 912, the verification engine 101 can then classify or re-rank the candidate sets such that the verified candidate confirmed as the likeliest match is candidate image 910 (and that the game package being captured by the device is the one corresponding to game platform "B".

In embodiments, the verification engine 101 can register each of the candidate images prior to executing verification.

In embodiments, the verification engine 101 can execute training functions associated with building the database 102 of candidate images and building verification technique selection criteria.

Building verification technique selection criteria as system training can include classifying verification techniques (i.e., one or both of image processing and matching techniques) for candidate images stored in the database 102. Verification techniques can be classified by using the available techniques to process every candidate image of a particular class or category of candidate images. The techniques can be observed to determine which verification techniques (e.g., which combinations of image processing and matching techniques) prove to be most discriminative for the processed class of candidate images. The identified verification techniques can be scored based on these observations, such as according to a correlation between each verification technique and the particular class. The scoring can be a weighting of the techniques, a prioritization or hierarchy determination of the techniques for the candidate image class, a ranking of the verification techniques, etc. In addition to the verification image combinations, the scoring can also be applied to individual image processing and matching techniques.

The training executed by verification engine 101 can also include the building and updating of candidate database 102. The database building can include the addition of new candidate images as well as a modification to existing images. The new images can be processed according to one or more verification techniques, which can suggest a proper image classification or categorization (if the new image is of an unknown type). If the new candidate image to be added is of a known type (i.e., it is known what class the image belongs to, what objects are depicted in the image, etc.), the new image can be processed according to identified verification techniques for that candidate image class. As such, any pre-generated derivative images (such as a signature, or other versions of the image used in verification) can be created and stored accordingly. Also, the added image can be properly canonized according to the canonical form for that image class or category. As new images are added to a class or category of images, the entirety of a class or category can be processed, and canonized based on the processing results, such that the class of images remains current and properly incorporates any effects of changes to the image class (such as due to changes in the depicted objects type, class, products, etc.).

In embodiments where the verification engine 101 uses candidate matrices for the selection of verification techniques, the candidate matrices can be generated during the training functions and processes carried out associated with the building of the database. The groups of reference images for use in a candidate matrix can be determined according to one or more characteristics of the reference images. For example, the group of images can be selected according to a particular object depicted in the images (e.g., a product family), a type of object, a class or category of object, or any other common characteristic or parameter associated with the object depicted in the reference images or the reference images themselves that can be used to categorize a group as having one or more commonalities.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A computer-implemented method of image recognition verification involving a candidate image of a plurality of candidate images returned in response to an image recognition search, the method comprising:
   processing at least a portion of the candidate image according to at least one color space image processing technique, wherein the processing includes selecting at least one color channel as a prioritized image verification color channel based on a relative size of the at least one color channel in comparison to at least one other color channel within a color space;
   selecting at least one matching technique from two or more matching techniques based on the at least one color space image processing technique and one or more characteristics of the candidate image; and
   comparing the candidate image processed according to the at least one color space image processing technique with a query image of the image recognition search according to the at least one matching technique.

2. The method of claim 1, wherein the at least one color space image processing technique includes selecting a color channel of a multiple channel color space as an image verification color channel.

3. The method of claim 2, wherein the multiple channel color space is a two-channel color space.

4. The method of claim 3, wherein the multiple channel color space is an rg chromaticity space.

5. The method of claim 2, wherein the multiple channel color space is a three-channel color space.

6. The method of claim 5, wherein the multiple channel color space is one of an RGB, HSV or YUV color space.

7. The method of claim 2, wherein the at least one color space image processing technique includes selecting a plurality of color channels of the multiple channel color space as image verification color channels.

8. The method of claim 7, wherein the plurality of color channels selected are equal in size.

9. The method of claim 8, wherein the plurality of color channels selected have an equal number of pixels.

10. The method of claim 7, wherein the plurality of color channels selected are not equal in size.

11. The method of claim 10, wherein the plurality of color channels selected do not have an equal number of pixels.

12. The method of claim 7, further comprising selecting a prioritized order for the plurality of color channels selected as image verification color channels.

13. The method of claim 1, wherein the at least one color space image processing technique includes processing one of interlaced color channel coding and non-interlaced color channel coding from the candidate image.

14. The method of claim 13, wherein the at least one color space image processing technique includes determining an offset and a skip count for each color channel of the candidate image.

15. The method of claim 1, further comprising processing at least a portion of the query image according to the at least one color space image processing technique prior to comparing the candidate image with the query image.

16. The method of claim 15, further comprising generating a match score or confidence score for the candidate image based on the comparing of the candidate image with the query image processed according to the at least one color space image processing technique.

17. The method of claim 16, further comprising one of ranking or re-ranking the candidate image with respect to at least one other candidate image of the plurality of candidate images based on the match score or confidence score.

18. A system for image recognition verification involving a candidate image of a plurality of candidate images returned in response to an image recognition search, the system comprising:
   at least one processor; and
   a memory device storing software instructions executable on the at least one processor to:
      process at least a portion of the candidate image according to at least one color space image processing technique, wherein the processing includes selecting at least one color channel as a prioritized image verification color channel based on a relative size of the at least one color channel in comparison to at least one other color channel within a color space;

select at least one matching technique from two or more matching techniques based on the at least one color space image processing technique and one or more characteristics of the candidate image; and compare the candidate image processed according to the at least one color space image processing technique with a query image of the image recognition search according to the at least one matching technique.

19. A computer program product embedded in a non-transitory computer readable medium comprising instructions executable by a computer processor to perform image recognition verification involving a candidate image of a plurality of candidate images returned in response to an image recognition search, the instructions being executable by a computer processor to:

process at least a portion of the candidate image according to at least one color space image processing technique, wherein the processing includes selecting at least one color channel as a prioritized image verification color channel based on a relative size of the at least one color channel in comparison to at least one other color channel within a color space;

select at least one matching technique from two or more matching techniques based on the at least one color space image processing technique and one or more characteristics of the candidate image; and compare the candidate image processed according to the at least one color space image processing technique with a query image of the image recognition search according to the at least one matching technique.

* * * * *